(12) United States Patent
Tuto et al.

(10) Patent No.: US 10,161,113 B2
(45) Date of Patent: Dec. 25, 2018

(54) LOCKING DEVICE FOR SECURING A WEAR MEMBER

(71) Applicant: METALOGENIA RESEARCH & TECHNOLOGIES S.L., Premia de Mar (ES)

(72) Inventors: Joan Tuto, Fornells de la Selva (ES); Jorge Triginer Boxieda, Barcelona (ES); Justo Ortiz Garcia, Barcelona (ES)

( * ) Notice: Subject to any disclaimer, the term of this patent is extended or adjusted under 35 U.S.C. 154(b) by 77 days.

(21) Appl. No.: 15/315,921

(22) PCT Filed: May 28, 2015

(86) PCT No.: PCT/EP2015/061779
§ 371 (c)(1),
(2) Date: Dec. 2, 2016

(87) PCT Pub. No.: WO2015/185425
PCT Pub. Date: Dec. 10, 2015

(65) Prior Publication Data
US 2018/0044894 A1    Feb. 15, 2018

(30) Foreign Application Priority Data
Jun. 2, 2014    (EP) .................... 14382211

(51) Int. Cl.
*E02F 9/28*    (2006.01)
*E21C 35/193*    (2006.01)
(Continued)

(52) U.S. Cl.
CPC .......... *E02F 9/2841* (2013.01); *E02F 9/2825* (2013.01); *E02F 9/2891* (2013.01);
(Continued)

(58) Field of Classification Search
CPC ...... E02F 9/2841; E02F 9/2825; E02F 9/2833; E02F 9/2883; E02F 9/2816; E02F 9/2891;
(Continued)

(56) References Cited

U.S. PATENT DOCUMENTS

| 1,644,783 | A | | 10/1927 | Gustaf |
| 2,635,366 | A | * | 4/1953 | Hostetter .............. E02F 9/2841 |
| | | | | 37/459 |

(Continued)

FOREIGN PATENT DOCUMENTS

| CA | 2161505 A1 | 4/1997 |
| GB | 2151284 A1 | 7/1985 |

(Continued)

OTHER PUBLICATIONS

PCT International Preliminary Report on Patentability, (Chapter II of the Patent Cooperation Treaty), (PCT Article 36 and Rule 70).

*Primary Examiner* — Robert E Pezzuto
(74) *Attorney, Agent, or Firm* — Porzio Bromberg and Newman

(57) ABSTRACT

Locking device for securing a wear part (1) on a support (2) for excavators and similar machines, the locking device that comprises a locking element (20), with a locking end, a thread (40), and at least one helical spring (30) defining a longitudinal axis, where the spring (30) is at least partially threaded in the thread (40). The support (2) comprises a housing (12) and the wear part (1) comprises an orifice (11) so that, in a mounted position, the housing (12) and the orifice (11) are at least partially overlapped, where the locking device is able to be introduced in the housing (12), where, in the mounted position, the locking end at least partially emerges from the housing (12) and penetrates into the orifice (11).

24 Claims, 20 Drawing Sheets

(51) Int. Cl.
  *F16B 21/12* (2006.01)
  *F16B 19/02* (2006.01)
  *F16B 21/08* (2006.01)
  *F16B 37/12* (2006.01)

(52) U.S. Cl.
  CPC ............ *E21C 35/193* (2013.01); *F16B 19/02* (2013.01); *F16B 21/082* (2013.01); *F16B 21/125* (2013.01); *F16B 37/125* (2013.01)

(58) Field of Classification Search
  CPC ........... Y10T 403/585; Y10T 403/7066; Y10T 403/7075; E21C 35/193; F16B 21/125; F16B 19/02; F16B 21/082; F16B 37/125
  USPC ........ 37/450, 452–460; 403/318, 374.2, 459, 403/298, 374.1, 379.4
  See application file for complete search history.

(56) References Cited

U.S. PATENT DOCUMENTS

| | | | | |
|---|---|---|---|---|
| 4,663,867 A | * | 5/1987 | Hahn | E02F 9/2841 37/459 |
| 5,718,070 A | | 2/1998 | Ruvang | |
| 5,937,550 A | | 8/1999 | Emrich | |
| 6,108,950 A | * | 8/2000 | Ruvang | E02F 9/2825 37/452 |
| 6,799,387 B2 | * | 10/2004 | Pippins | E02F 9/2841 37/456 |
| 9,009,995 B2 | * | 4/2015 | Freund | E02F 9/2883 37/452 |

FOREIGN PATENT DOCUMENTS

| | | |
|---|---|---|
| WO | 2011/134014 A1 | 11/2011 |
| WO | 2013/030335 A1 | 3/2013 |

* cited by examiner

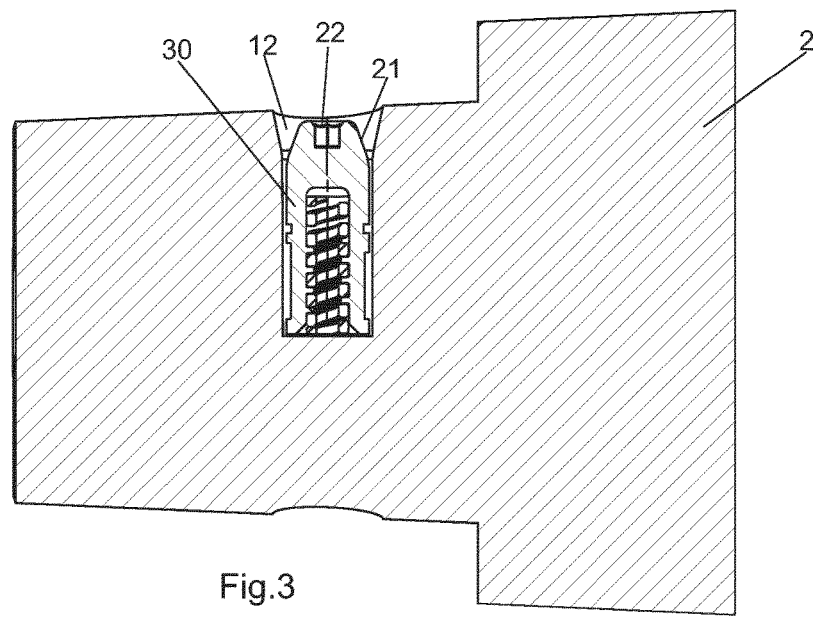
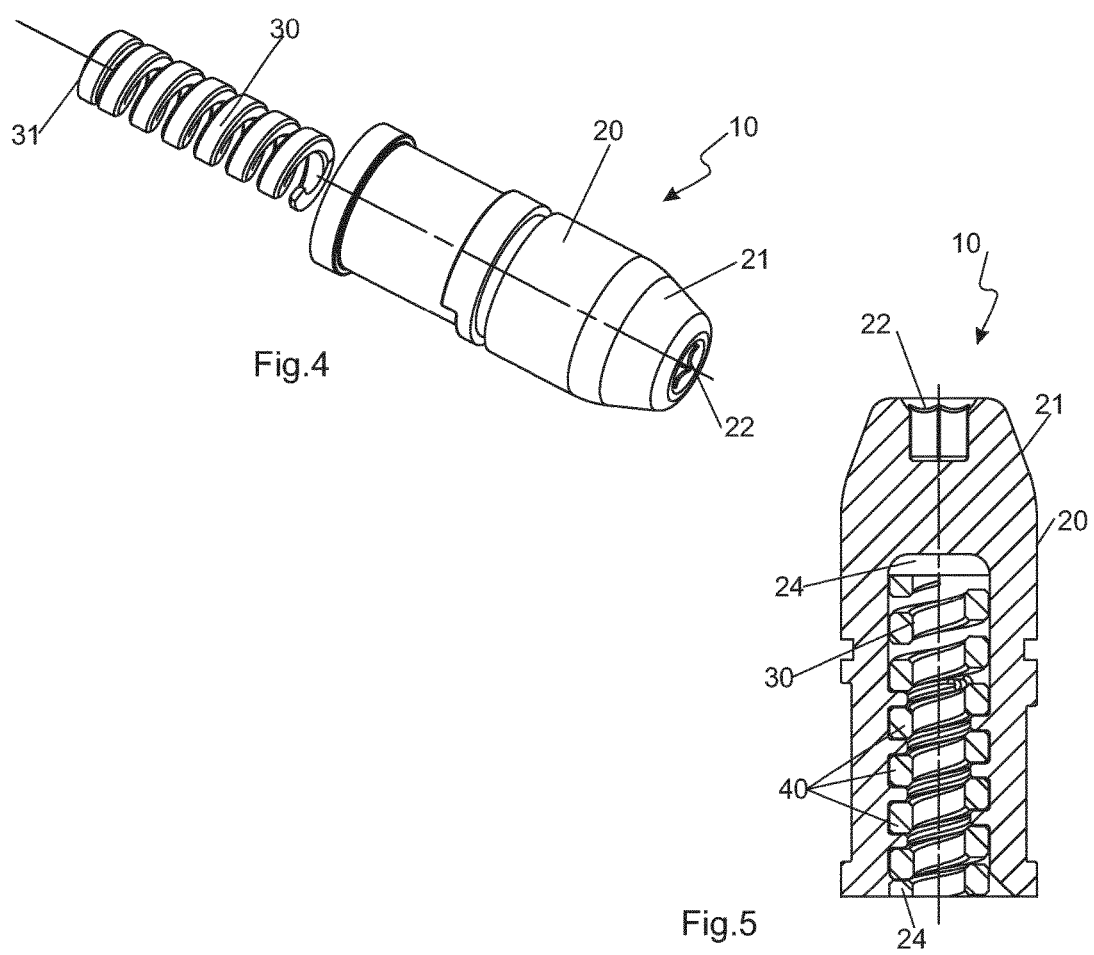
Fig.3
Fig.4
Fig.5

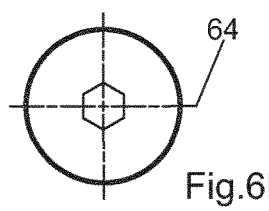
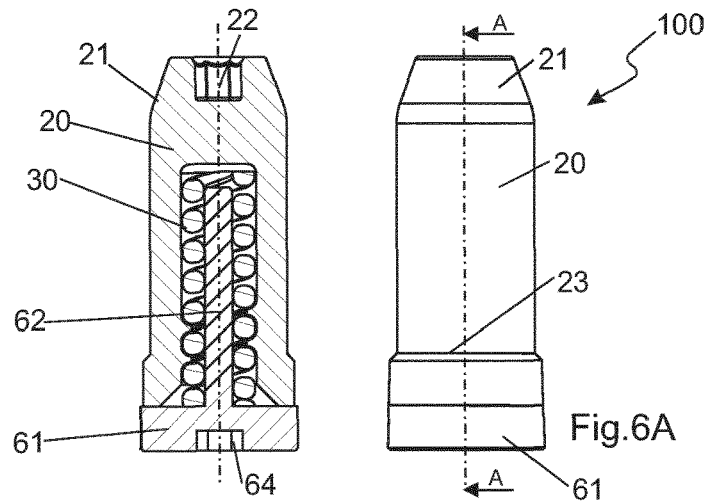
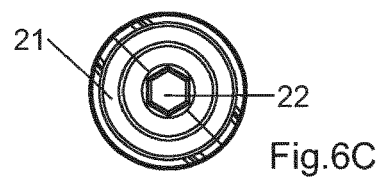
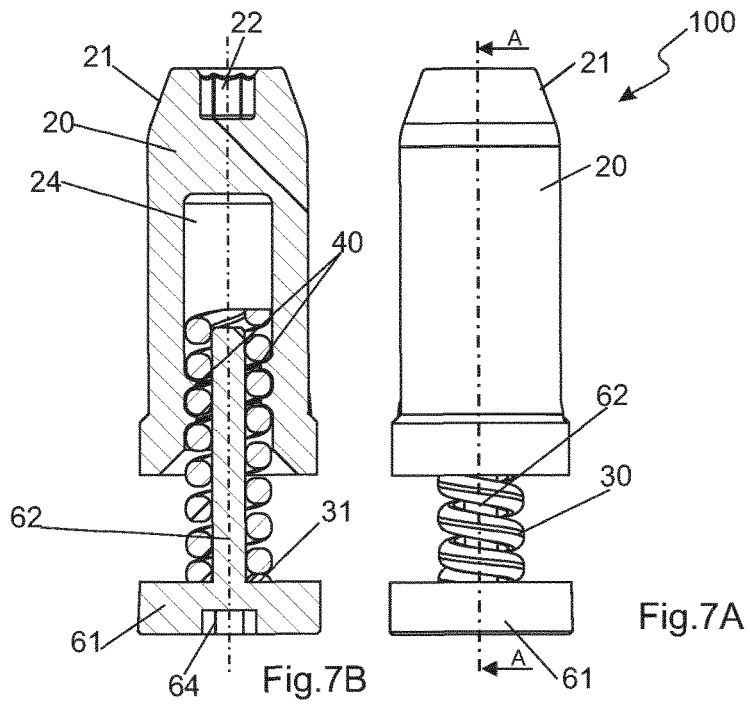

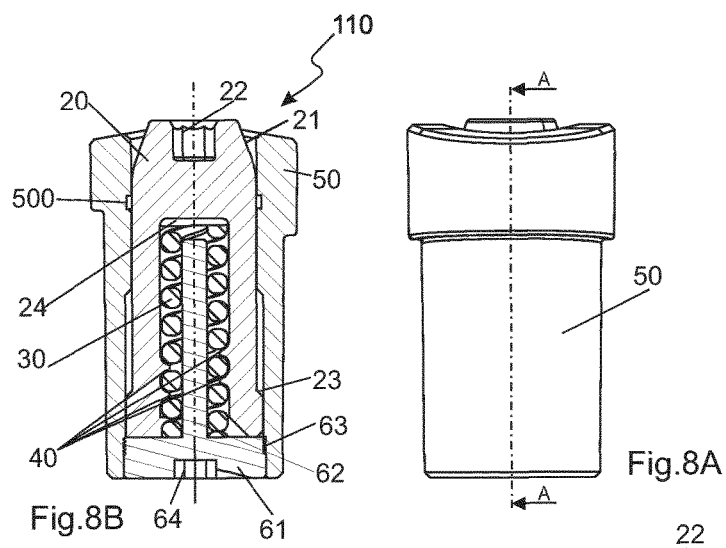

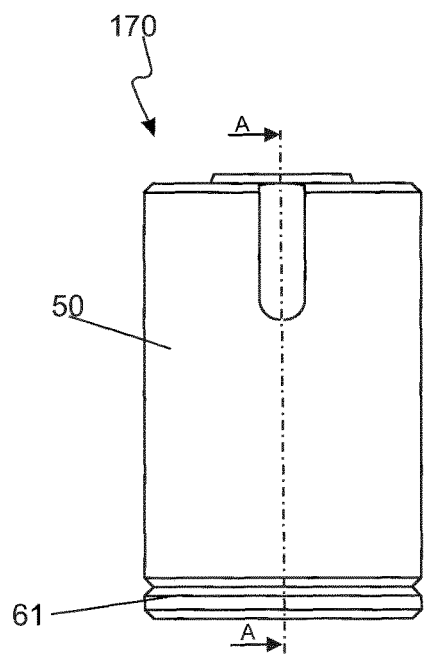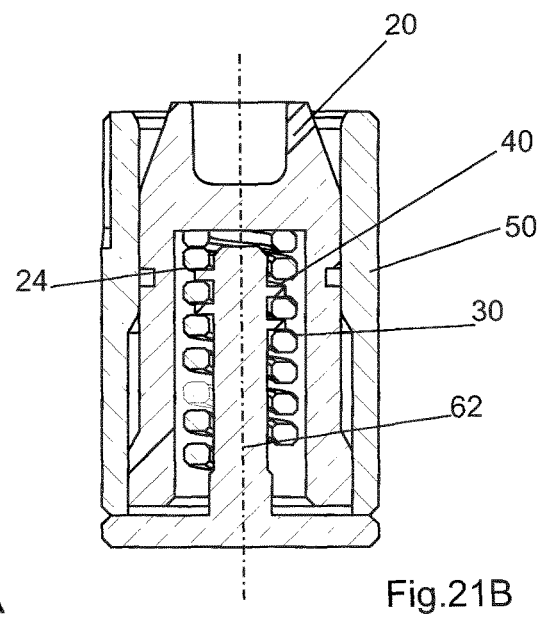
Fig.21A  Fig.21B
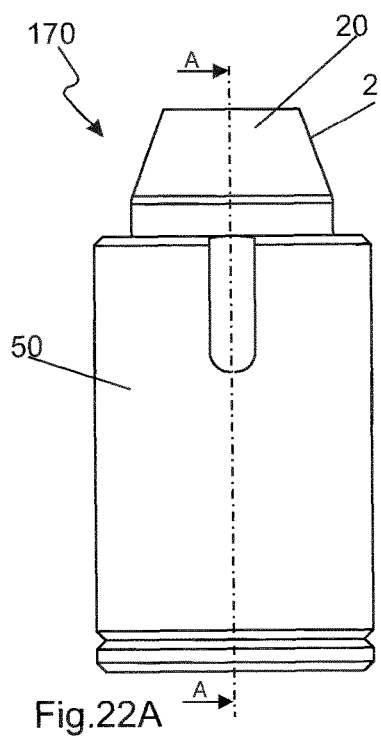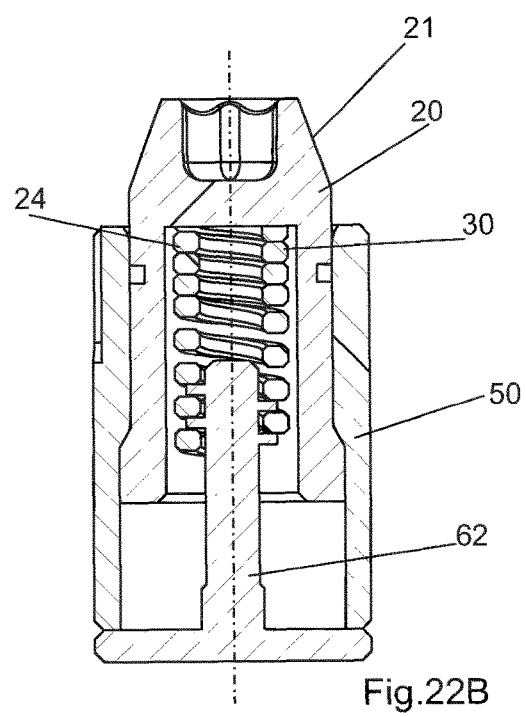
Fig.22A  Fig.22B

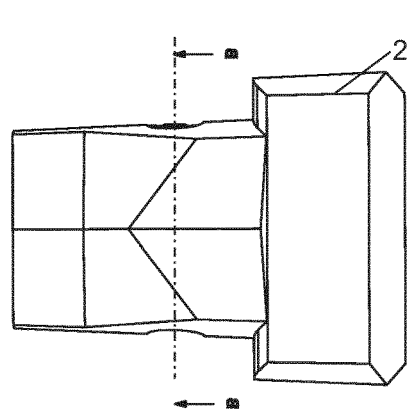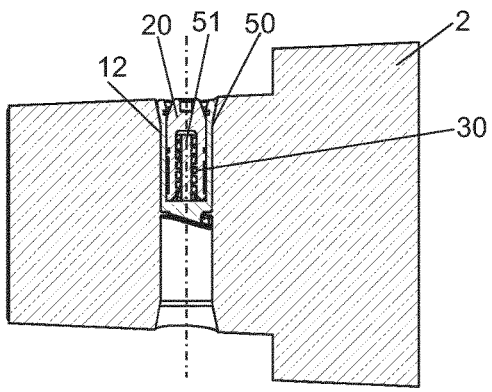
Fig.29A　　　　　　　Fig.29B
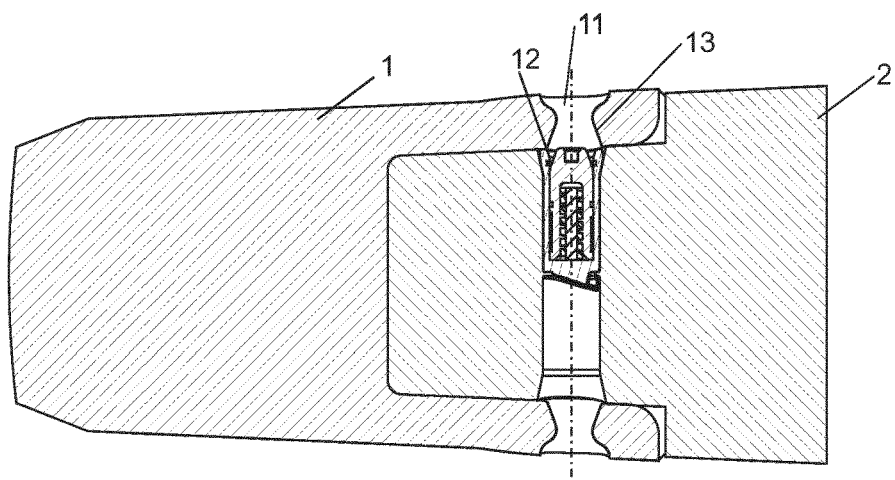
Fig.30
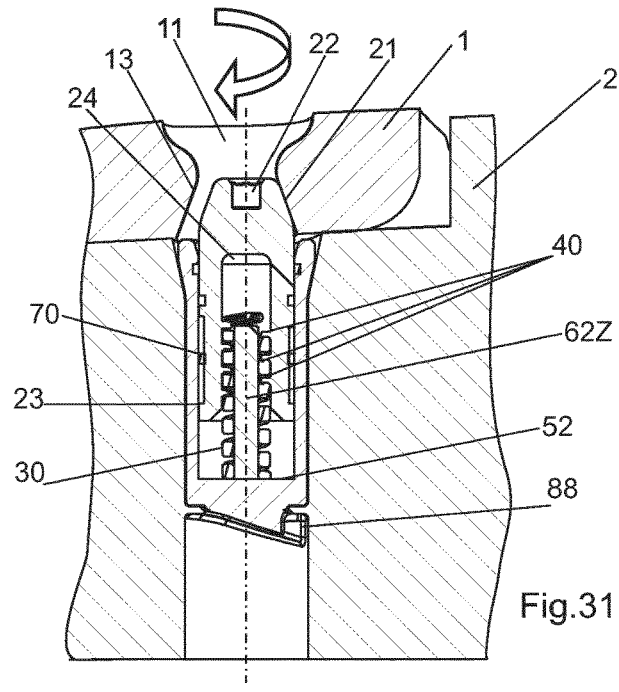
Fig.31

Fig.43A
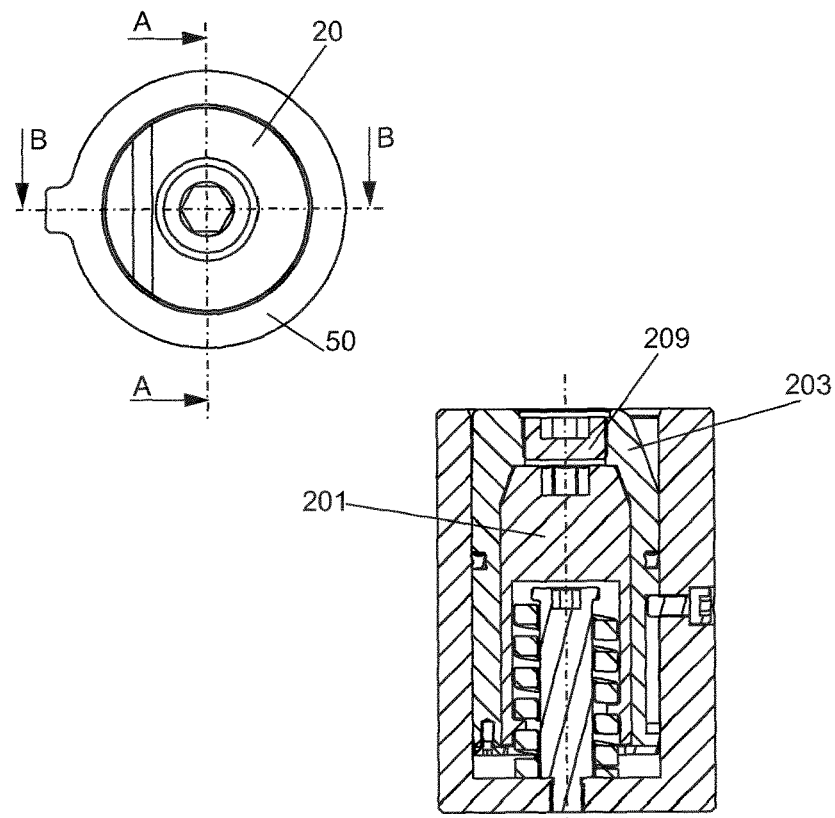
Fig.43B
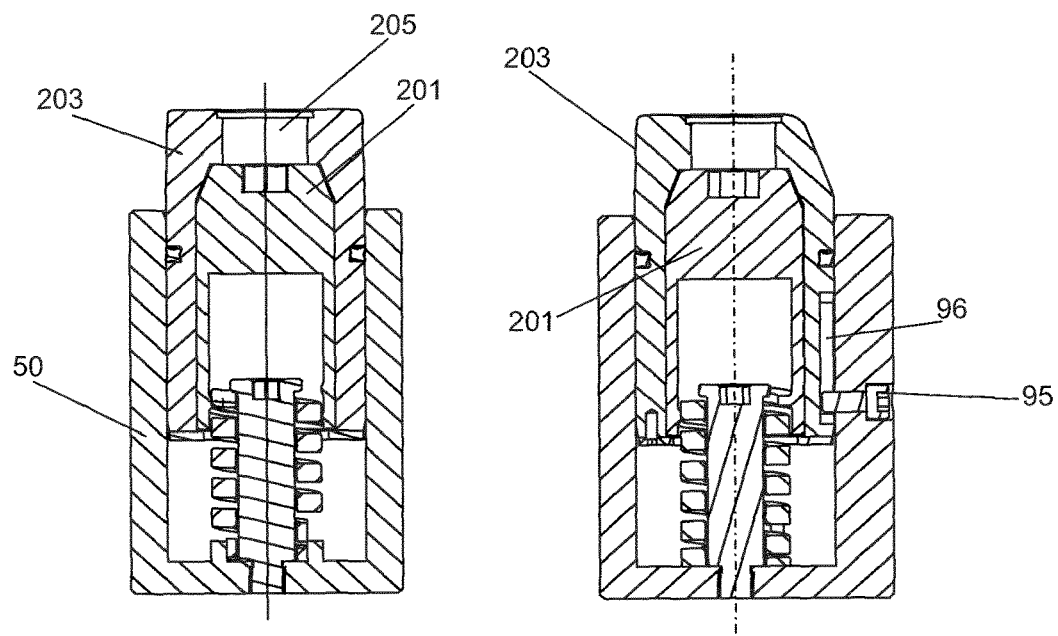
Fig.44A  Fig.44B

LOCKING DEVICE FOR SECURING A WEAR MEMBER

FIELD OF THE INVENTION

The invention relates to a locking device for securing a wear part (also named wear member) in a corresponding support (or adapter) for excavators and similar machines, where the support comprises a housing and the wear part comprises an orifice so that, in a mounted position, the housing and the orifice are at least partially overlapped, where the locking device is able to be introduced in the housing.

The invention relates also to a wearable system comprising a wear part, a support and a locking device, where the support comprises a housing and the wear part comprises an orifice so that, in a mounted position, the housing and the orifice are at least partially overlapped, where the locking device is able to be introduced in the housing.

The invention relates additionally to a wearable system comprising a wear part, and a support, where the support comprises a housing and the wear part comprises an orifice so that, in a mounted position, the housing and the orifice are at least partially overlapped.

The invention relates also to a process for fixing a wear part in a support with a locking device, where the support comprises a housing and the wear part comprises an orifice so that, in a mounted position, the housing and the orifice are at least partially overlapped, where the locking device is able to be introduced in the housing, the locking device comprising:
- a locking element, with a locking end, where, in the mounted position, the locking end at least partially emerges from the housing and penetrates into the orifice,
- a thread, preferably being the thread at the locking element, and
- at least one helical spring defining a longitudinal axis, where the spring is at least partially threaded in the thread, the spring being fixed in respect of the support in order to prevent its rotation in respect of the support

STATE OF THE ART

Earthmoving machinery used for excavating, loading and moving materials such as rocks, sands, overburden and minerals, are usually equipped with one or more buckets or dippers attached to a mechanical arm. The bucket or dipper is provided with a blade or lip on its front edge intended to penetrate the ground and load the material. To prevent excessive wear of the lip and to increase its penetration of the ground, it is common to fit wear parts or wear members on the lip, such as teeth, adapters (tooth holders), lip protectors and side protectors.

These wear parts or wear members are subject to wear and stress that can deteriorate them. Bucket teeth are usually the most exposed wear parts having to be frequently replaced. In addition, these machines may work in a wide range of applications, where changing the tooth design might be necessary to improve the performance of the bucket. These wear parts can be attached to other wear parts (such as a tooth attached to an adapter) and can be attached to the blade or lip (such as an adapter attached to a lip). The mechanical coupling between wear parts is usually done through a retaining element, for example a locking device or pin.

Furthermore, the service life of a wear part coupling is also limited due to wear, fatigue, and plastic deformation. Two types of wear can be distinguished: the outer wear of the parts due to the flow of the excavated or loaded material, and the inner wear due to the material (dirt, fines) that is introduced between the wear parts coupling (for example between the tooth and the adapter). This material located inside the coupling between two mechanical parts increases the wear of the inner areas of such parts, due to the movement between these parts while the bucket is in operation.

Statistically, a tooth with an average wear life performs more than 50,000 work cycles; as a result, the coupling must be designed to prevent the defects generated due to the fatigue phenomena, such as cracks, to be compatible with the plastic deformation of wear parts that happens due to the stress reactions generated to counteract the forces suffered by the wear parts, etc.

An unwanted gap appears when there is plastic deformation and/or inner wear on the contact areas of the wear parts coupling. This gap increases the movement between the coupling's parts, increasing the risk of losing or breaking them. The gap increases over time, due to more plastic deformation and/or inner wear.

The bearing surfaces of adapters are the most affected by the inner wear and plastic deformation because the steel used on adapters usually has a lower hardness than the steel used on teeth. The contact and friction between parts, one harder than the other, results on the deformation of the softer part. If there is fines in-between the coupling, the inner wear adds on the plastic deformation, increasing even more the gap between the contact areas of the attached parts. It is very important to reduce and avoid the movement between the attached wear parts to avoid breakages and loses of wear parts. Large earthmoving machines, especially those operating in quarries and mines, are essential for the production of the sites. Downtime on these machines due to a lost or broken part can be very costly for the customers. A lost or broken part can end up inside the crusher too, damaging and disabling this critical installation and resulting on a very expensive repair. A lost or broken wear part (also the change of the wear part when it is worn out, because it is important to change the tooth before it broke or wear out) will also require stopping the machine to assemble another part, resulting on wasted production time. For all these reasons, it is critical to make sure that wear parts do not break or fall off from the buckets or dippers.

Nevertheless, plastic deformation and inner wear cannot be avoided. Teeth are manufactured with steels with a hardness between 450-550 HB to maximize their wear life. Adapters that have to be welded on lips cannot be produced as the same steels as teeth because it would be extremely difficult and risky to weld them on the lips; these adapters are usually manufactured with steels with lower carbon content, obtaining a hardness between 300-400 HB, resulting on an Ceq<0.7, guaranteeing its weldability. Large earthmoving machines such as mining rope shovels, draglines and large hydraulic excavators are commonly equipped with cast lips (blades with integrated cast noses). These cast lips are usually manufactured with steels with a hardness between 200-280 HB due to the need of offering structural flexibility and high ductility to the lip, avoiding the generation of cracks on the lips. In these mining applications, plastic deformation and inner wear are very common and are the main reason of wear parts' breakages and loses.

Other important feature of the locking device or pin is that it has to be safe and easy to assemble and disassemble allowing a quick change of the wear member. The safety of the operators is extremely important and the machine's downtime must be reduced as much as possible to maximize its operating time, so the needed time to replace teeth has to be minimized. Further, it is convenient to be able to change the wear parts in the field, in the same spot where the machine is working, without having to take the machine or bucket to the workshop to use special equipment. Conventional locking devices require a hammer to assemble and disassemble the pin. In order to make this procedure safe an easy, a hammerless locking system is desirable. This means that the pin has to be assembled and disassembled in a hammerless manner, i.e., without needing a hammer for introducing or removing the pin.

Document DE 202011101484 U1 describes a pin comprising a capsule with a spring within, for coupling a tooth on a tooth holder, where the pin has to be introduced in a housing in the tooth holder with the help of a special tool. This tool compresses the spring in the housing and maintains it compressed during the coupling of the tooth on the tooth holder, making the assembly difficult and unsafe. Further, the described pin makes it difficult to replace a tooth once it is worn out, as there are no means to compress the spring once it is introduced in the housing of the tooth holder. On the other hand the spring cannot be fixed to the housing, so it can be compressed undesirably during operation, and therefore the tooth could fall off while the bucket is digging or leading material. A similar device is described in US 2010/0257759 A1.

Document U.S. Pat. No. 5,937,550 describes a pin made up of multiple components that is introduced in a housing of a tooth holder to maintain a tooth coupled to said tooth holder. Once coupled the tooth on the tooth holder, the movements of one respect to the other due to plastic deformation are absorbed by the elastic material. The spring is used to maintain the inner components in place. The pins described in this document comprise multiple components that make the installation and maintenance of the pin more difficult, plus the probability of failure is increased. Said pins comprise, among other components, a spring, a locking element attached to a sleeve and an elastic element made of an elastic material.

Document GB 2.151.284 describes a device for retaining a cutter pick in a pick box in which an helical fastening member of circular section is used for forming a thread between two elements.

Document U.S. Pat. No. 3,030,088 describes a locking device with a locking element in which a helical spring pushes the locking element to an extended position, whereas an external force can push the locking element to a retracted position.

DISCLOSURE OF THE INVENTION

The aim of the present invention is to solve the problems present in the devices of the state of the art. So, an important feature of the invention is that the pin system has been designed to reduce and eliminate the gap produced by the inner wear and plastic deformation, recovering the contact between the bearing surfaces of the tooth and the adapter. This feature will allow the coupling to operate with no gap because the locking device will adapt itself to the new contact areas between the wear parts. This means that the locking device adapts itself to the new contact areas automatically, without the need of having an operator stopping the machine to retighten and reposition the locking system. This offers greater reliability, allowing an optimum fit between all parts. Additionally, the present invention also intends to obtain a locking device or pin that is safe and easy to assemble and disassemble allowing a quick change out of the wear parts through a hammerless-style locking device. In addition, it targets to have less components (reducing the cost and the risk of failure).

This purpose is obtained by the means of a locking device for securing a wear member on a support for excavators and similar machines characterized in that it comprises:
a locking element, with a locking end,
a thread,
at least one helical spring defining a longitudinal axis, where the spring is at least partially threaded in the thread, and
screwing means for screwing and unscrewing the locking element in or from said spring (30).

Preferably the support comprises a housing and the wear part comprises an orifice so that, in a mounted position, the housing and the orifice are at least partially overlapped, where the locking device is able to be introduced in the housing, where, in the mounted position, the locking end at least partially emerges from the housing and penetrates into the orifice.

In this way, the locking device according to the invention allows an easy assembly and disassembly, without the need of a hammer and with a reduced number of components. The helical spring takes benefit of its helical form and is directly threaded on a thread, allowing the axial displacement of the spring (which will force also the movement of the locking element along said axis), which allows a plurality of advantages as will be shown below.

Preferably the length of the locking element and the spring in an at least partially threaded position in the thread is smaller or equal than the length of the housing. So, the operator will introduce the locking element in this at least partially threaded position in the housing and, as the locking element will not protrude outside from the housing, the operator will be able to put the wear part over the support without any opposing force exerted by the locking element. Most preferably, the length of the locking element and the spring in a completely threaded position in the thread is smaller or equal than the length of the housing.

The locking element and the spring are threaded together, so that the spring works both as a screw and as a spring, allowing the locking element to resize itself, varying its length, depending of the wearing conditions between the wear member and the adapter. This set up also prevents the locking device from unintentionally unblocking itself during operation due to an undesirable compression of the spring.

In order to be able to work both as a screw and as a spring, it is necessary that, if the spring is at least partially unthreaded of the thread, the unthreaded part of the spring has its unthreaded turns free so that the unthreaded part is able to change its length. So, the threaded part works like a thread whereas the unthreaded part works simultaneously like a spring.

The coupling between the wear member or tooth, usually a "female part" in the sense that it has a hole in which a nose from the adapter is introduced, and the adapter or tooth holder, usually a "male part" in the sense that it has a nose that is introduced inside a hole present in the wear member, as well as the uncoupling, are performed in a simple way, from the outside, without the need to use special tools or apply strong forces on the locking device, which can be dangerous. At the same time it provides solid and reliable coupling while working due to the fact that the locking device or pin can absorb slight movements of the wear member over the adapter and auto-adjusts its length.

Inverse systems are also possible, where the male part is part of the tooth and the female part is part of the adapter.

The locking device explained also would be used in three part systems. These three part system consist of a point, an intermediate part and a weld or cast adapter. The cast or weld adapter is provided with the male part, the intermediate part is provided with a female part on the back and with a male part on the front and the point is provided with another female part.

To secure the wear member to an adapter, the locking device is first introduced in a housing of the adapter with the locking end facing the outside of the adapter and the base of the spring inside the housing. Although it is preferably that the locking device is introduced into a housing of the adapter, it will also be feasible introduced into a housing of the wear member.

In one preferred alternative the spring is in a fixed position and the thread is moved by the action of the operator so that the spring screws or unscrews from the thread, whereas in another preferred alternative what is fixed is the thread and the spring is moved by the action of the operator. As will be seen later, both alternatives allow the design of advantageous solutions. In any case the screwing or unscrewing of the spring from the thread tends to move the locking element in an axial direction.

In one preferred solution the spring is directly fixed to said support. In fact, it must be possible to have a relative rotation between the spring and the thread so that it can be in a more or less screwed position. As it will be seen later, the thread may be positioned in a plurality of components or places of the locking device, each of them allowing a different fixing of the spring so that it can be screwed and unscrewed from the thread. In this preferred alternative, the spring is fixed, for example, to the housing by welding or using means or interconnections that are included in the housing, in order to prevent the rotation of the spring around its axis when it is screwed or unscrewed to the thread. With this solution, the locking device has a minimum of parts.

In another preferred solution the locking device comprises, additionally, a supporting body, able to be allocated in the bottom of the housing, and the spring is fixed in respect of the supporting body in order to prevent its rotation in respect of the supporting body. This alternative allows an easier way of fixing the spring in respect of the thread, and avoids the need of intervention in the adapter.

Advantageously the locking end comprises a bearing surface that form a non-zero angle with said longitudinal axis, where, in said mounted position, the bearing surface is in contact with a corresponding bearing surface present in the orifice. As explained above, one aim of the present invention is to obtain a reliable assembly between wear parts (especially between teeth and adapters, and between adapters and cast noses) cancelling the negative effects of the gap generated by plastic deformation and/or the wear in-between the coupling, plus compensating the gaps due to the manufacturing tolerances between wear parts. The locking device or pin object of the present invention, intends to correct the misalignments between the fitting or coupling of wear parts produced by plastic deformation, inner wear and also due to manufacturing tolerances. With this preferred solution this problem is solved, as the locking device assures always a full contact between both bearing surfaces and presses constantly the tooth against the adapter, also if the wearing of these parts changes their geometries.

The bearing surface of the locking element is preferably complementary in shape with the corresponding bearing surface of the orifice so that a better contact between both is achieved. In this sense the locking end of the locking element has preferably a truncated cone shape. A preferred embodiment has a locking element with a locking end which bearing surface shaped as a truncated cone and an orifice with a bearing surface which is a flat surface, where the angle of the truncated cone and the angle between the flat surface and the axis of the cone (in a mounted position) are the same, so that the contact between the truncated cone and the flat surface is along a generatrix of the truncated cone.

Preferably the supporting body comprises a guide or shaft introduced in the spring. This allows guiding the spring, maintaining it in an axial position, avoiding axial movements and giving the spring more stability.

Advantageously the supporting body comprises lateral walls defining a capsule, able to accommodate at least partially said locking element. So, the supporting body is like a tube with a closed end (the base of the supporting body) and lateral walls that define a capsule where the locking element can be allocated. Another preferable solution is when the locking device comprises a capsule, able to accommodate at least partially the locking element, where the supporting body is fixed to one end of the capsule. In both cases, the capsule isolates the spring and the thread from debris, powder, etc. In the first case, the supporting body and the capsule are formed as one single part, reducing the quantity of parts of the locking device. In the second alternative, it is easier to fix the spring to the supporting body, as it can be done before fixing the capsule to the supporting body. Additionally, it is easier to mechanize both parts as separate parts and also this second alternative could made both parts of different materials.

Preferably the capsule comprises anti-rotation means able to avoid the rotation of the supporting body in respect of the housing in the mounted position. This prevents that the whole locking device rotates respect the housing in the adapter when the spring is screwed or unscrewed from the thread. Advantageously the anti-rotation means comprises a wall extending parallel to the longitudinal axis. It can be positioned, for example, on the outer lateral surface of the capsule or on the lower surface of the base of the supporting body. This last alternative allows reducing the overall diameter of the locking device.

Preferably the locking device comprises ejection means that includes a helicoidal wall, which is coaxial with the longitudinal axis. It can also be positioned on the outer lateral surface of the capsule or on the lower surface of the base of the supporting body.

The thread can be allocated in different parts of the locking device. One preferred alternative is that the thread is on the locking element. In this case there are two possible alternatives: the thread can be in the outer surface of the locking element (so that the spring screws over the locking element) or it can be in the inner surface of an inner cavity foreseen in the locking element, the inner cavity being axially oriented and opened at the end opposite to the locking end. In this second alternative, the spring will be allocated at least partially inside the inner cavity and the thread will be over the spring. Another preferred alternative is to include the thread on the guide (on the external surface from the guide). In this case, the spring will screw over the thread.

Preferably the locking device has stopping means able to avoid that the locking element can go out completely from the capsule, so avoiding the possible loss of the locking element during the assembly or during operation. Preferably the stopping means comprises a first stopping surface in the outer surface of the locking element and a second stopping surface in the inner surface of the capsule, so that the first stopping surface is longer in a radial direction respect of the longitudinal axis than the remaining part of said outer surface of the locking element and so that the second stopping surface protrudes out of the remaining part of the inner surface of the capsule. Both the first stopping surface and the second stopping surface are preferably annular surfaces, so that they offer a big contact surface between them. Another possible alternative of the stopping means can include a pin (preferably a screw) inserted in the lateral wall of the capsule so that its end projects in the interior of the cavity defined by the capsule and in the interior of a lateral groove foreseen in the lateral surface of the locking element.

Advantageously the locking element has an annular groove and a tightening ring inserted in it. So, the interior of the capsule can be better isolated from the debris, powder, etc.

Preferably the locking device comprises a second locking element, opposed to the locking element, and a second spring, opposed to the spring. This allows a symmetrical fixing of the wear part at two opposite sides thereof. As it will be shown below, this can be achieved in several ways. In one case, the housing of the adapter is a through hole and the capsule or the supporting body comprises a second bearing surface, so that both bearing surfaces can project outside of the housing at both ends of it. Other possible alternatives are providing a supporting body with two opposed capsules, each of them including a locking member according to the invention. A third possible solution could be, for example, simply using two locking devices according to the invention in two opposed housings, which may be internally connected or not. If the locking device only locks one side of the wear part and adapter system, this might cause that the wear part inclines or tilts in working conditions. To obtain a stable system it is preferably to have a double locking device. The double locking device extends along all the width of the adapter, improving the stability of the system. Furthermore the diameter of the locking device could be smaller and the strength of the nose of the adapter is better.

Advantageously the screwing means are in the locking element. Usually the operator will screw and unscrew the thread from the spring by rotating the locking element. Therefore, the locking element has preferably screwing means that facilitates this operation. The screwing means is preferably in the locking end Alternatively, the screwing means are in said guide. A preferred solution including this alternative and the corresponding advantages are explained later on.

Preferably the screwing means comprise a hole, coaxial with the longitudinal axis, which has not cylindrical symmetry according to the longitudinal axis. So, any tool with an outer lateral surface corresponding to the inner lateral surface of the hole will provoke the rotation of the hole when rotated along the longitudinal axis. The hole may be, for example, a hexagonal hole oriented towards the outside so that the operator can easily introduce the corresponding tool in it and rotate the locking element.

Preferably the locking element comprises and internal insert disposed in the inner cavity of the locking element, where the thread is in the insert. This has several advantages:
  the locking element and the insert may be of different materials, if required,
  the insert may be threaded before being inserted into the inner cavity of the locking element. This allows using better machining techniques that, for example, allows increasing the radius between the thread base and the lateral internal wall of the insert, increasing the mechanical properties of the thread.

In one preferred alternative the insert is a generally U shaped part, where the base of the U is oriented towards the end of the inner cavity of the locking element and the inner surfaces of the legs of the U comprise the thread. In another preferred alternative the insert is a ring with both ends opened and the thread is in the inner annular wall of the ring.

Preferably the thread is shorter than the spring. In fact, only the last turns of the thread (in fact only the last turn of the thread) will be subjected to mechanical forces. So it is possible to design a thread with only one turn o two turns.

As has been explained before, the locking device may have a supporting body. The supporting body has a base with an upper surface, oriented towards the locking element and a lower surface, opposite to the upper surface. In general, the thread has an upper end, close to the locking end, and a lower end, opposed to the upper end. In this case, a preferred solution is obtained when, in an initial locking position, the space between the lower end of the thread and the upper surface of the base of the supporting body is such that the spring is completely out of the thread. In fact, when the designer is designing the locking device, he will define an initial locking position taking into account the specific use foreseen for the locking device (the geometry of the wearable system, formed by a wear part and a support, where it will be used, the working conditions foreseen for the wearable system, the wear foreseen for the wearable system, etc.). The locking position may change during use (for example due to wear, as commented before) but the designer will always define an initial locking position and will design the different parts of the locking device taking into account this initial locking position. Therefore, the initial locking position is in fact a specific feature of the locking device. As will be explained later, this preferred solution optimizes the length of the spring (using the shortest spring), which also allows to minimize the size of the inner cavity of the locking element, i.e., the space between the lower end of the thread and the upper surface of the base of the supporting body (minimizing the size of the whole locking device and rigidifying the locking end) and "informs" the operator that the assembly has been finished with a loud "click".

Advantageously the spring has at least one flat surface in the end of its outer lateral surface close to the supporting body and the supporting body has a corresponding flat surface in contact with the flat surface of the spring. Alternatively, the locking element has an inner cavity and the spring is allocated in the inner cavity and is fixed to the locking element, where the spring has at least one flat surface in the end of its outer lateral surface close to the locking end and the inner cavity has a corresponding flat surface in contact with the flat surface of the spring. Both alternatives are an easy way of fixing the spring to the locking device, as will be explained with further detail later on.

One possible problem may appear if the locking element rotates during use, specifically an accidental or not desired rotation of the locking element due to the friction with stones or ground, loosening the coupling between the wear part and the support. In order to avoid this problem, several advantageous solutions are possible:
  the bearing surface of the locking end has at least one flat face, where, in the mounted position, the flat face of the bearing surface of said locking end is in contact with a corresponding flat face present in the bearing surface of the orifice, and preferably the locking end has a plurality of these flat faces. As a preferred solution, the locking end has the shape of a frustum of a pyramid.

the guide is rotatably fixed to the supporting body (61), where the locking element has an access hole at said locking end, and preferably the locking device comprises second anti-rotation means able to avoid the rotation of the locking element in respect of the capsule.

the locking element comprises a core and a casing, the core being rotatably mounted in the casing, where the casing comprises the locking end and has an access hole at the locking end, and preferably the locking device comprises second anti-rotation means able to avoid the rotation of the casing in respect of the capsule.

the capsule has, in its inner lateral surface, a plurality of grooves parallel to each other and extending parallel to the longitudinal axis and the locking element has, in its outer lateral surface, at least one elastic protrusion allocated in one of the grooves, the elastic protrusion being able to be elastically deformed so that it can be displaced from one of the grooves to another one through a relative rotation movement, along the longitudinal axis, of the capsule in respect of the locking element.

Another object of the invention is a wearable system comprising a wear part, a support and a locking device, where the support comprises a housing and the wear part comprises an orifice so that, in a mounted position, the housing and the orifice are at least partially overlapped, where the locking device is able to be introduced in the housing characterized in that the locking device comprises:

a locking element, with a locking end, where, in the mounted position, the locking end at least partially emerges from the housing and penetrates into the orifice, at least one helical spring defining a longitudinal axis, a thread, preferably at the locking element, where the spring is at least partially threaded in the thread, the spring being fixed in respect of the support in order to prevent its rotation in respect of the support, and screwing means for screwing and unscrewing the locking element in or from the spring.

The housing of the wearable system may be a blind hole. In this case, a preferred solution is obtained when, in an initial locking position, the space between the lower end of the thread and the base of the housing is such that the spring is completely out of the thread, with the advantages explained above. As can be seen, in this case the base of the blind hole that conforms the housing plays the role of the base of the supporting body.

An additional object of the invention is as wearable system comprising a wear part, and a support, where the support comprises a housing and the wear part comprises an orifice so that, in a mounted position, the housing and the orifice are at least partially overlapped, characterized in that it comprises a locking device according to invention, where the locking device is able to be introduced in the housing and, in the mounted position, the locking end at least partially emerges from the housing and penetrates into the orifice.

Preferably the spring has a length such that, in an initial locking position, the spring is completely out of the thread.

Another object of the invention is a process for fixing a wear part in a support with a locking device, where the support comprises a housing and the wear part comprises an orifice so that, in a mounted position, the housing and the orifice are at least partially overlapped, where the locking device is able to be introduced in the housing, the locking device comprising:

a locking element, with a locking end, where, in the mounted position, the locking end at least partially emerges from the housing and penetrates into the orifice, a thread, preferably being the thread at the locking element, and at least one helical spring defining a longitudinal axis, where the spring is at least partially threaded in the thread, the spring being fixed in respect of the support in order to prevent its rotation in respect of the support, characterized in that it comprises the following steps:

insertion of the locking device in the housing, positioning of the wear part over the support in the mounted position, so that the housing and the orifice are at least partially overlapped, unscrewing the locking element from the spring until the locking end penetrates into the orifice and contacts the wear part, (preferably the locking element has a bearing surface and the wear part has also a corresponding bearing surface and the contact between both elements is through their bearing surfaces), further unscrewing the locking element from the spring until the spring is in a compressed state. This compressed state will force the locking element always in the axial direction out of the housing, i.e., towards the wear part. So, any change in the geometry of the wear part, the adapter and/or the locking device itself will be compensated by the biasing force of the spring, which will maintain the different parts in their assembled positions.

In general, the locking device is preferably a locking device according to the invention.

Advantageously the step of further unscrewing the locking element from the spring is done until the spring is in a completely compressed state.

Preferably the step of further unscrewing the locking element from the spring is done until the spring is completely out of the thread. At this moment, the operator will hear a loud "click" that will inform him that the unscrewing step has finished, so avoiding that the spring is overturned or avoiding that it is not completely compressed.

Advantageously the process comprises a step previous to the insertion step consisting in screwing the locking element on the spring. This allows to form a mounted assembly which is easy to handle and includes all the elements of the locking device. This step may be done by the operator or, preferably, is done by the manufacturer of the locking device, so that the locking device is delivered as said mounted assembly.

Preferably the length of the locking element and the spring in an at least partially threaded position in the thread is smaller or equal than the length of the housing. Most preferably, the length of the locking element and the spring in a completely threaded position in the thread is smaller or equal than the length of the housing.

The step to screw the locking element on the spring may be done when the spring is already fixed in the housing or before fixing the spring in the housing.

An advantage of the invention is that in front of undesired external forces that may bring the locking element inwards in accidental way, the locking element cannot be introduced completely inside the housing anymore, because the locking element does not have enough space in the housing to be completely introduced, as the space has been occupied by the compressed part of the spring that is not screwed to the locking element. Therefore, the locking element may not be pushed out from the interference or locking position until it is screwed on the spring again.

The only way to disassemble the tooth from the adapter is to screw the locking element over the spring completely again. This has the advantage of preventing the loose of the teeth in accidental way, as may happen in the device described in prior art document DE202011101484A1.

BRIEF DESCRIPTION OF THE DRAWINGS

To better understand the object of the present application, figures in which several practical embodiments are depicted schematically and only by way of non-limiting example are attached.

FIG. 3—A sectional view of a nose of an adapter with a first embodiment of a locking device according to the invention within the housing.

FIG. 4—An exploded view of the locking device of FIG. 3.

FIG. 5—A sectional view of the locking device of FIGS. 3 and 4.

FIGS. 6A-6D—A front view, upper view, lower view and sectional view according to line A-A, respectively, of an alternative embodiment of a locking device according to the invention with a supporting body.

FIGS. 7A-7B—A front view and a sectional view according to line A-A, respectively, of the locking device of FIGS. 6A-6D in an extended position.

FIGS. 8A-8B—A front view and a sectional view according to line A-A, respectively, of an alternative embodiment of a locking device with a supporting body structure and a capsule or sleeve.

FIGS. 9A-9B—A front view and a sectional view according to line A-A, respectively, of the locking element of the locking device of FIGS. 8A-8B.

FIG. 10—A view of the supporting body of the locking device in FIGS. 8A-8B.

FIGS. 11A-11B—A front view and a sectional view according to line A-A, respectively, of the capsule or sleeve of the locking device in FIGS. 8A-8B.

FIGS. 21A-21B—A front view and a sectional view according to line A-A, respectively, of a locking device with the locking element in retracted position.

FIGS. 22A-22B—A front view and a sectional view according to line A-A, respectively, of the locking device of FIGS. 21A-21B with the locking element in compressed or locking position.

FIG. 29A-29B—A front view and a sectional view according to line B-B, respectively, of an adapter with two locking devices opposed to each other as shown in FIG. 28.

FIG. 30—A sectional view of a wear member mounted or coupled to an adapter, specifically a tooth on a tooth holder, before the locking element is extended.

FIG. 31—A partial sectional view of the locking element being unscrewed when the tooth and tooth holder have been coupled.

FIGS. 43A-43B—An upper view and a sectional view according to line B-B, respectively, of an alternative embodiment of a locking device.

FIGS. 44A-44B—A sectional view according to line A-A and according to line B-B, respectively, of the locking device of FIGS. 43A-43B in extended position.

DETAILED DESCRIPTION OF SEVERAL EMBODIMENTS OF THE INVENTION

Figure 1:
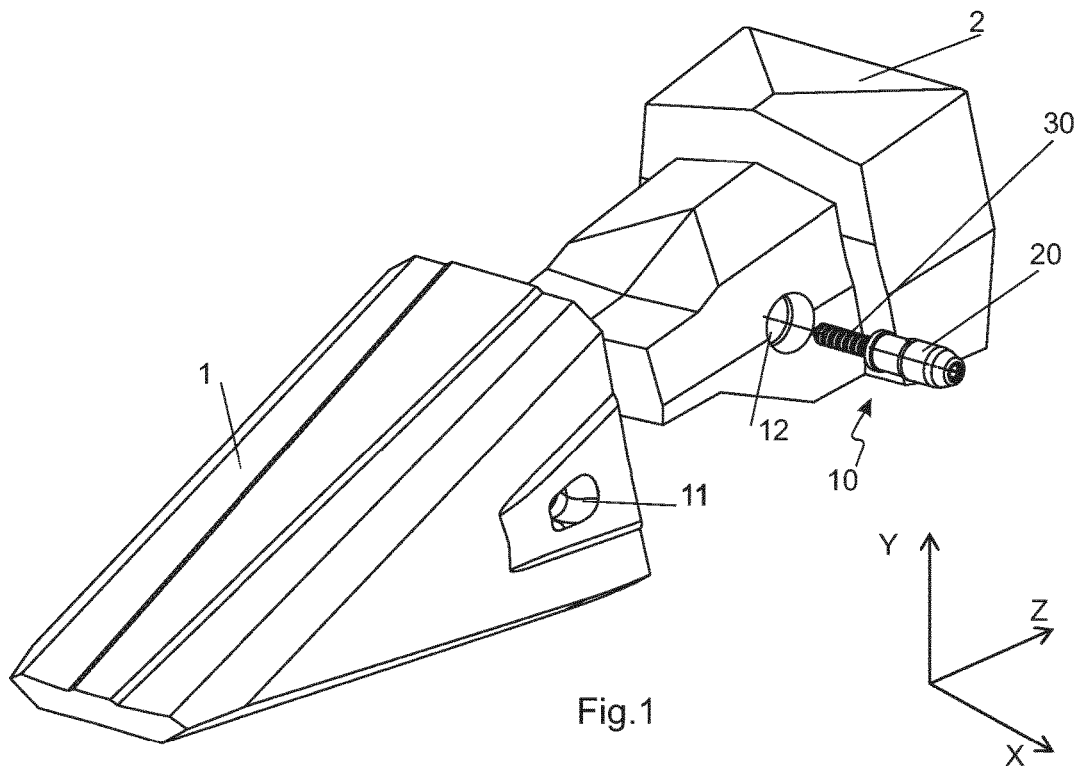
FIG. 1—Exploded view of a locking device (or pin) object of the present invention with a wear member (a tooth) and an adapter where the wear member is mounted.
Figure 2:
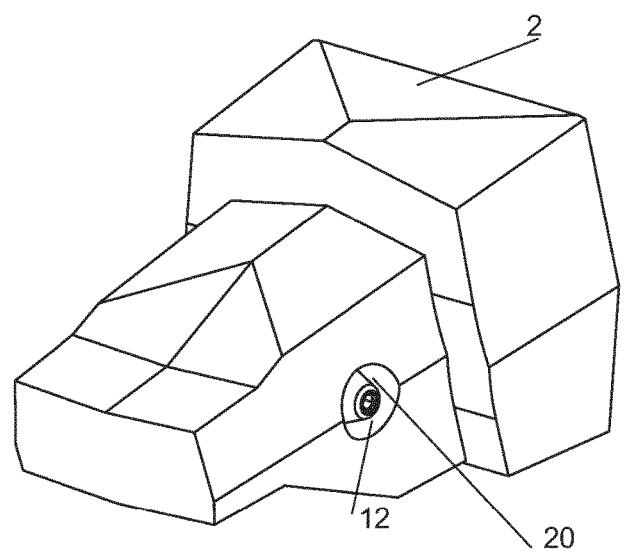
FIG. 2—Nose of an adapter with the locking device mounted in the housing.

FIG. 1 shows a first embodiment of a locking device or pin 10 comprising a spring 30 and a locking element 20 before being introduced in a housing 12 of an adapter 2. A wear element 1, with at least one orifice 11 is also shown before being coupled on the adapter 2. FIG. 2 shows the locking device or pin of FIG. 1 completely introduced in the housing 12 of the adapter 2. In FIG. 1, the housing 12 where the pin is to be introduced is horizontal, but it can either be vertical or longitudinal.

FIGS. 3 to 5 show a first embodiment of a locking device or pin 10 object of the present invention that comprises a cylindrical locking element 20 with an inner cavity 24 and a thread 40 in the internal surface of the inner cavity 24. A spring 30 is screwed to the thread 40 of the locking element 20. One end of the spring 30, the base 31, is attached to the housing 12 to prevent the rotation of the spring 30 when the same is being screwed to the locking element 20; while the opposite end of the spring 30 is screwed to the locking element.

The locking element 20 is also provided with a bearing surface 21 to contact with the corresponding bearing surface 13 of the wear element 1. The locking element is provided with a screwing means 22 to connect a tool that facilitates the screwing and unscrewing the locking element 20 to the spring 30.

In this first embodiment the spring 30 is fixed, by mechanical means or welded or adhered, to the base of the housing 12 of the adapter 2.

A second embodiment of a locking device or pin 100, see FIGS. 6A-6D and 7A-7B, adds a supporting body 61 where the spring 30 is attached or fixed to prevent the spring 30 from turning when the locking element 20 is screwed or unscrewed. Moreover the supporting body 61 serves to assemble more easily the locking device in the adapter.

Furthermore, the supporting body 61 is fixed or attached to the housing 12 and may have anti-rotation means to avoid its rotation inside the housing 12 of the adapter 2.

Said supporting body 61 comprises a guide 62, which serves to maintain the spring in its axial position when the spring 30 and the locking element 20 are screwed. This guide 62 can be part of the supporting body 61 or may be weld or mechanically fixed on the supporting body. In some occasions the guide 62 could be a single part and would be fixed in any other element.

FIGS. 7A-7B show the spring 30 attached to the supporting body 61 and the locking element 20 partially screwed to the spring 30 through the thread 40. The supporting body 61 has also screwing means 64 in its bottom surface.

To further improve the locking device, in FIGS. 8A-8B to 11A-11B an alternative embodiment 110 is shown. The embodiment 110 comprises a capsule 50 formed by a body with preferably the shape of a cylindrical tube or hollow cylindrical body with two opened ends, upper end 85 and lower end 86, and a cavity 84. In the mounted position, the lower end 86 will be at the bottom or base of the housing 12 whereas the upper end 85 will be at the opening of the housing, i.e., faced to the orifice 11 of the wear element 1.

The cavity 84 of the capsule 50 is provided with a base thread 83, specifically near to the lower end 86. The base thread 83 is screwed to a supporting body 61 through its corresponding screw 63. Although, the capsule 50 preferably has a cylindrical tube or hollow cylindrical body, the capsule 50 could be any body of revolution or any shape that avoids its rotation inside the housing 12 of the adapter.

Moreover, inside the cavity 84 of the capsule 50 and near to the upper end 85 of the capsule 50 a groove 500 is provided in which an O-ring is introduced. The capsule 50 together with the O-ring prevent the entry of dirt into the pin and housing, avoiding the damage of the spring 30. It is also possible and supplementary to include an O-ring in the outer surface of the locking element 20, as in the embodiment of FIGS. 12 and 13.

In this locking device 110, the supporting body 61 is attached or fixed to the lower end 86 of the capsule 50. The supporting body 61 is preferably attached to the capsule 50 through a screw 63, although other fixing means are possible, one example could be welded. The supporting body 61 comprises a perpendicular guide 62 that will be introduced inside the spring 30 to maintain the spring in its axial position when the spring 30 and the locking element 20 are screwed. The spring 30 is attached through mechanical means or welded to the supporting body 61.

To assemble the locking device, the subassembly comprising the supporting body 61 with the spring 30 attached to it and the locking element 20, screwed to the spring 30, is introduced in the capsule 50 through its lower end 86, so that the guide 62 and the spring 30 are positioned in the inner cavity 24 on the locking element 20. After that the supporting body 61 is screwed to the capsule through the screw 63 and the base thread 83.

The locking device is provided with a stopping means that avoids that the locking element 20 goes out from the upper end 85 of the capsule 50. In this embodiment the stopping means are stopping surfaces 82, 23. I.e., the locking element 20 is provided with an annular stopping surface 23 that will contact with the annular stopping surface 82 of the capsule 50 to stop the path of the locking element 20, avoiding that the locking element 20 goes out from the upper end 85.

The locking device 110 has anti-rotation means formed as a wall 88 extending parallel to the longitudinal axis and positioned in the outer lateral surface of the capsule 50. The housing 12 has a corresponding wall so that if the capsule 50 rotates inside the housing 12, both walls interfere with each other blocking the capsule. Additionally, the locking device 110 has ejection means that includes a helicoidal wall 81. This helicoidal wall has the same axis as the spring 30. So, when the locking element 20 is in its retracted position, an additional rotation forces the capsule out of the housing 12. This allows an easy extraction of the locking device from the housing 12. In this embodiment, the helicoidal wall 81 is also in the outer lateral surface of the capsule 50.

Figure 12:
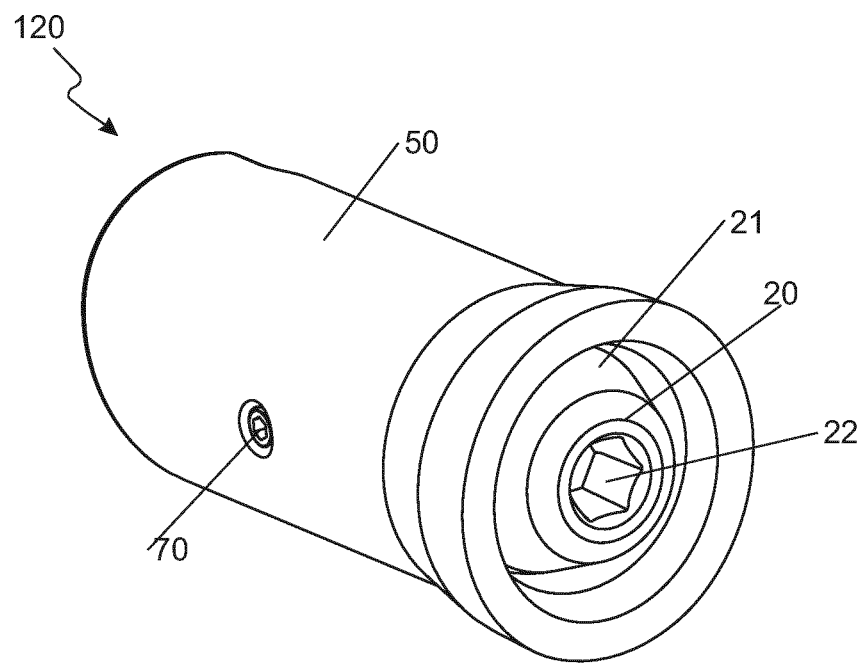
FIG. 12—A perspective view of an alternative embodiment of a locking device, where the supporting body and the capsule are the same element.
Figure 13:
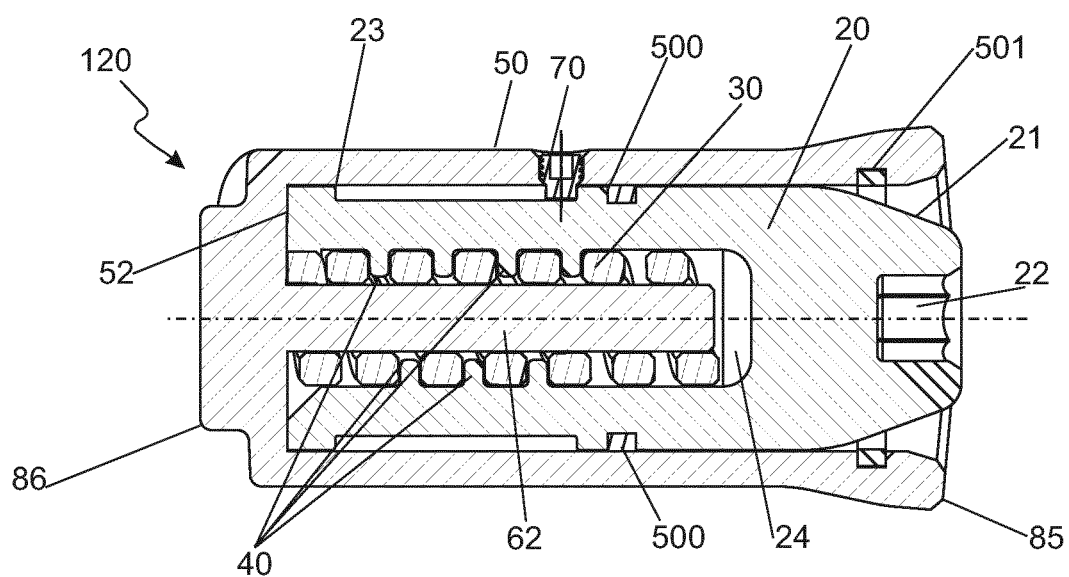
FIG. 13—A sectional view of the locking device of FIG. 12.

Another embodiment 120 of the locking device is the one shown in FIGS. 12 and 13, where the supporting body 61 with the guide 62 and the capsule 50 are built as a single element. Therefore, the capsule 50 has only one open end, the upper end 85, and the cavity 84 of the single element (supporting body+guide+capsule) is provided with an inner surface 52 on its base where the spring 30 is fixed.

In this embodiment 120, in order to assemble the locking element 20, the spring 30 is introduced through the upper end 85 of the capsule 50 and then it is fixed to the inner surface 52 to prevent the spring 30 from rotating when the locking element 20 is screwed on it. After that, the locking element 20 is also introduced through the upper end 85 of the capsule 50 and screwed to the spring 30 till the locking element 20 is totally introduced in the cavity 84 of the capsule 50.

This embodiment 120 uses a bolt 70 as a stopping means. Said stopping element 70 has the function of preventing the locking element 20 from coming out from its path, inside the capsule 50. Once the locking element 20 and the spring 30 have been assembled inside the capsule 50, the stopping element 70 is fixed from the exterior of the capsule 50 crossing a wall of said capsule 50, so that its end is in a lateral groove foreseen in the outer lateral wall of the locking element 20, preventing and stopping the exit of the locking element 20 from the capsule 50. Afterwards the locking device or pin 120 is introduced in the housing 12 of the adapter 2.

The locking element 20 has a groove 500 to house a O-ring, preferably of an elastomeric material, that contributes to prevent the entry of dirt in the pin and assures the tightness between the capsule 50 and the locking element 20 so that the operation of the spring 30 in the locking device 20 is not damaged.

Figure 15:
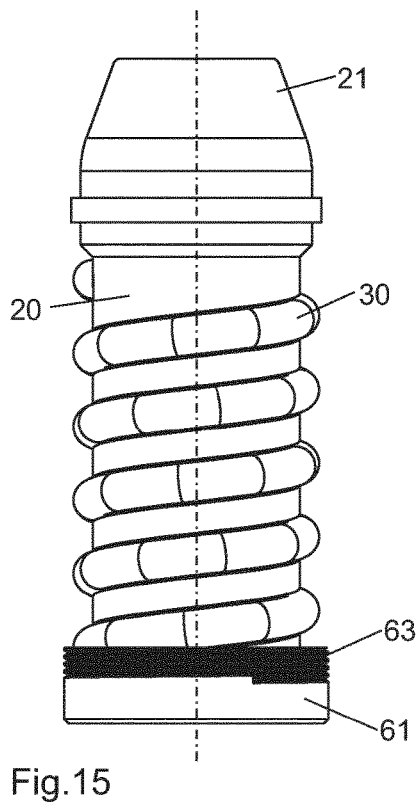
Figure 14:
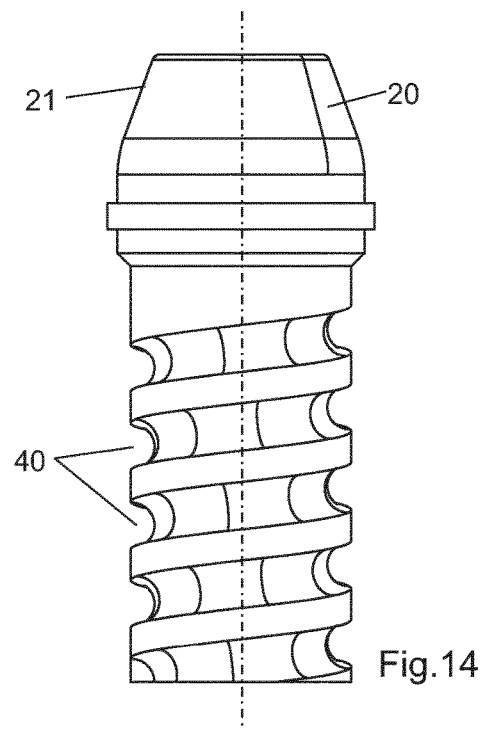
FIG. 14—A front view of an embodiment of a locking element with the thread on its outside surface FIG. 15—A front view of the locking element of FIG. 14 mounted on the supporting body and with the spring screwed on its thread.
Figure 16:
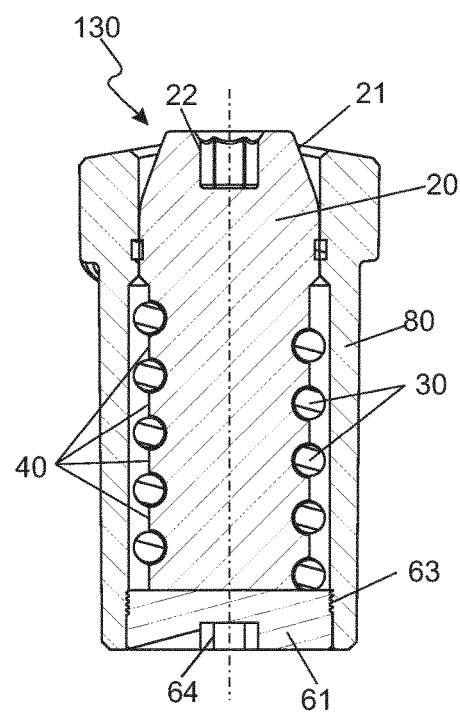
FIG. 16—A sectional view of a locking device including the locking element of FIGS. 14 and 15.

A further embodiment 130, see FIGS. 14 to 16, shows another locking device or pin 130 where the thread 40 is placed on the outer surface of the locking element 20, instead of, as in the previous embodiments, in the inner cavity 24 of the locking element 20. The spring 30 is attached to a supporting body 61 that is attached or fixed to a capsule 50. Said capsule 50 is screwed to the supporting body 61 through a screw 63. In this embodiment 130, the function of the guide for maintaining the spring 30 in an axial position is made by the locking element 20 itself; the supporting body 61 is not provided with a guide 62.

In this embodiment 130, as in the previous one, in order to prevent the assembly formed by the spring 30 and the capsule 50 from rotating when the locking element 20 is screwed on it, the capsule 50 or the supporting body 61 comprises anti-rotation means somewhere in their outer surface that interacts or contacts with the surfaces of the housing 12 where the pin 130 is introduced to prevent the rotation of said supporting body 61 and the capsule 50 and therefore to prevent the rotation of the spring 30.

Figure 17:
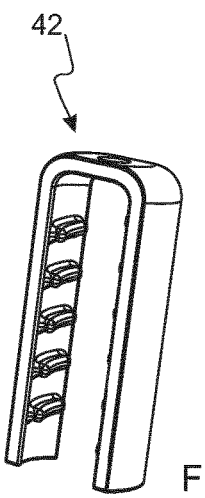
FIG. 17—A perspective view of an insert.
Figure 18:
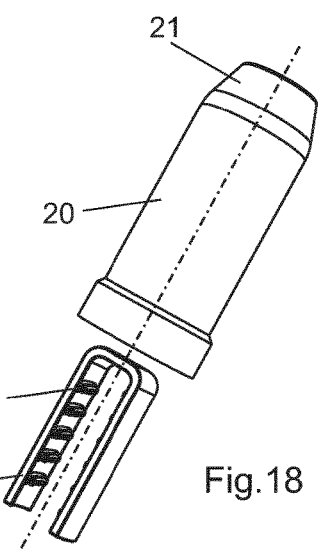
FIG. 18—An exploded view on the insert of FIG. 17 and a locking element.
Figure 19B:
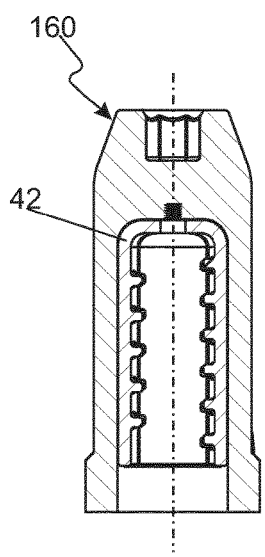
FIGS. 19A-19B—A front view and a sectional view according to line A-A, respectively, of the locking element with the insert of FIGS. 17 and 18.
Figure 19A:
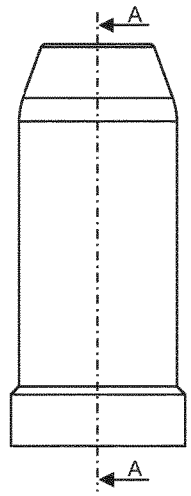
Figure 20C:
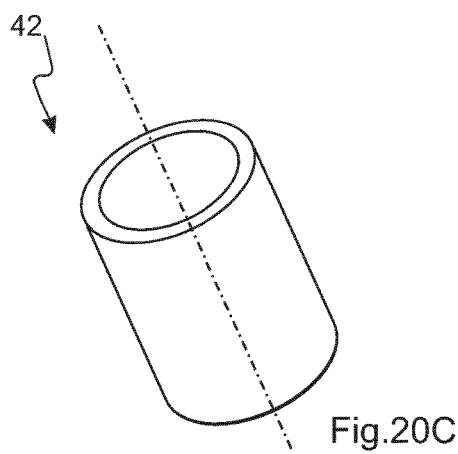
FIGS. 20A-20C—An upper view, a sectional view according to line A-A and perspective view, respectively, of another insert according to the invention.
Figure 20A:
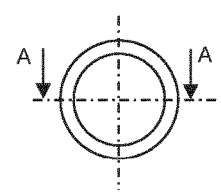
Figure 20B:
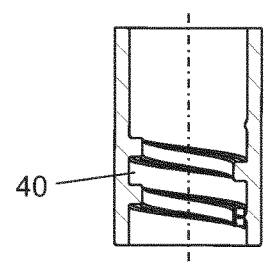

In other embodiments, see FIGS. 17 to 20A-20C, the thread 40 is placed in an additional element or insert 42 of the locking element 20. In FIG. 17 the insert 42 has a U shape, where the base of the U is fixed at the upper end of the inner cavity 24 of the locking element 20 (i.e., close to the locking end) with a screw (see FIGS. 18 and 19A-19B, embodiment 160). In FIGS. 20A-20C the insert 42 has an annular shape with both ends opened.

FIGS. 21A-21B and 22A-22B show a further embodiment 170 of a locking device according to the invention. In this example the thread 40 is on the guide 62. The spring 30 is fixed in the upper end (close to the locking end) of the inner cavity 24 of the locking element 20. FIGS. 21A and 21B show the locking element in its retracted position. When the operator screws the locking element 20 out of the capsule 50 the spring 30 accompanies the locking element 20 in its movement. When the bearing surface 21 of the locking element 20 enters into contact with the corresponding bearing surface 13 of the wear part 1 (not shown in this figures), the locking element 20 cannot continue its movement out of the capsule 50, but the spring can continue unscrewing from the thread 40, so that it compresses in the upper end of the inner cavity 24 of the locking element 20, as shown in FIGS. 22A and 22B.

The previous embodiments (10, 100, 110, 120, 130, 160 and 170) refer to simple locking devices that only lock one side of the wear part or tooth and the adapter system, and this could cause that the tooth inclines or tilts in working conditions. In order to improve the stability of the system, the wear member and the adapter may be fixed through two opposite sides. To obtain this stability double locking devices are used, or a simple one with a length equal to the width of the housing 12 that coincides with the width of the nose of the adapter 2, where the locking device or pin extends along all the width of the adapter. So the wear member 1 and the adapter 2 will be fixed through two opposite sides. The description of different embodiments of double locking devices or pins will follow.

Figure 23:
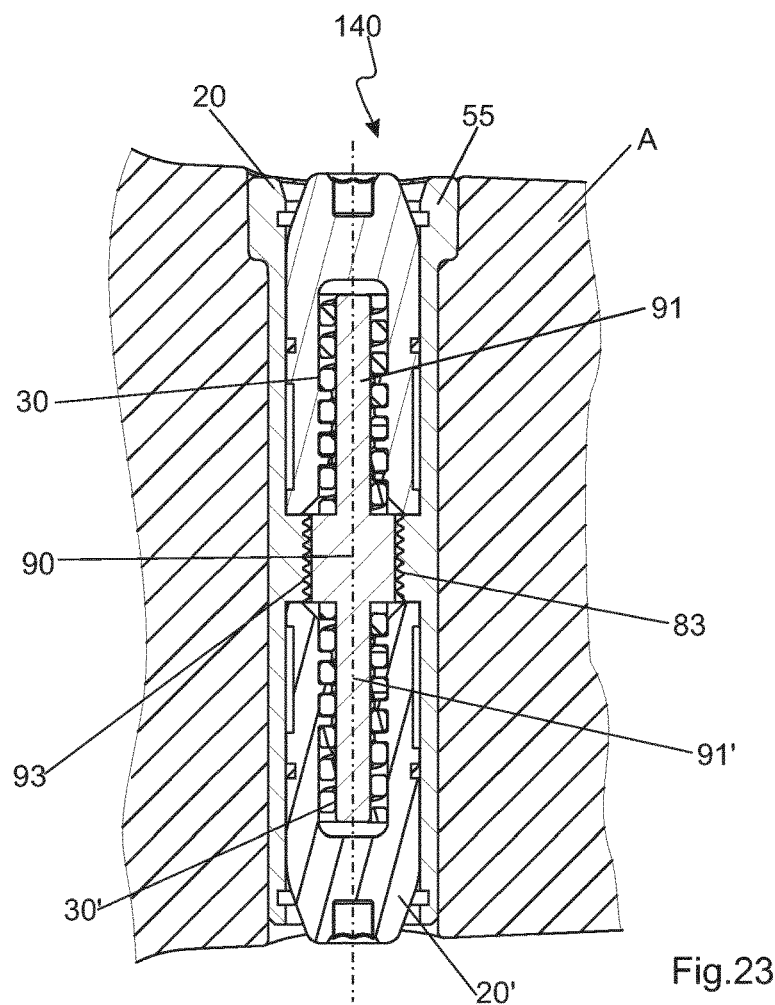
FIGS. 23—A partial sectional view of a locking device with two locking elements in a supporting body with two capsules or sleeves, mounted in an adapter.
Figure 24:
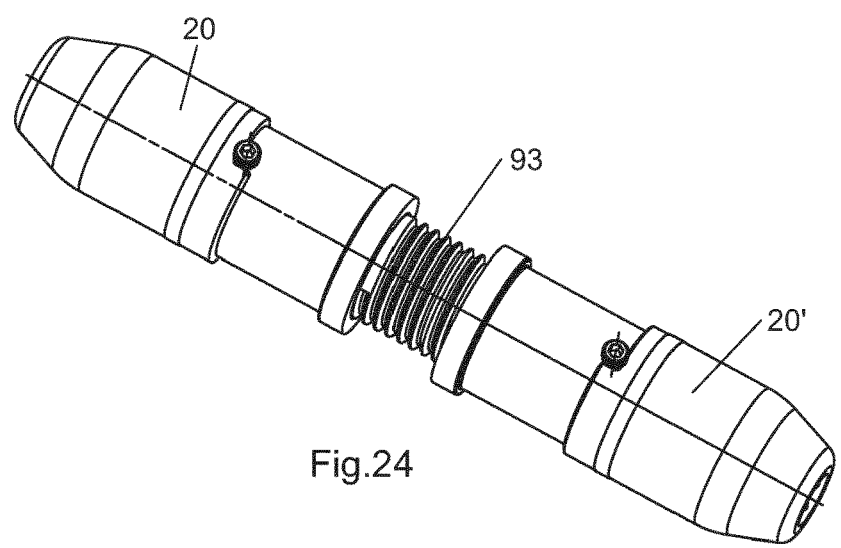
FIG. 24—A perspective view of the locking device of FIG. 23.

FIGS. 23 and 24 show an embodiment 140 of a locking device that comprises two opposing locking elements 20, 20'. This embodiment comprises a supporting body 90, with two perpendicular guides 91, 91', screwed through a thread 93 to the base thread 83 of a capsule 55. Capsule 55 is conceptually the union of two opposed capsules 50 as described before. Both locking elements 20, 20' are introduced at each of the opposite openings of capsule 55. Capsule 55 is as long as the housing 12 of the adapter 2 where the locking device is going to be placed. The supporting body 90 supports springs 30 and 30' and on each of its opposite sides one of the locking elements 20, 20' is screwed. The components and features of the locking device of this embodiment 140 can be the same as the ones of the previously described locking devices with only one locking element.

Figure 25:
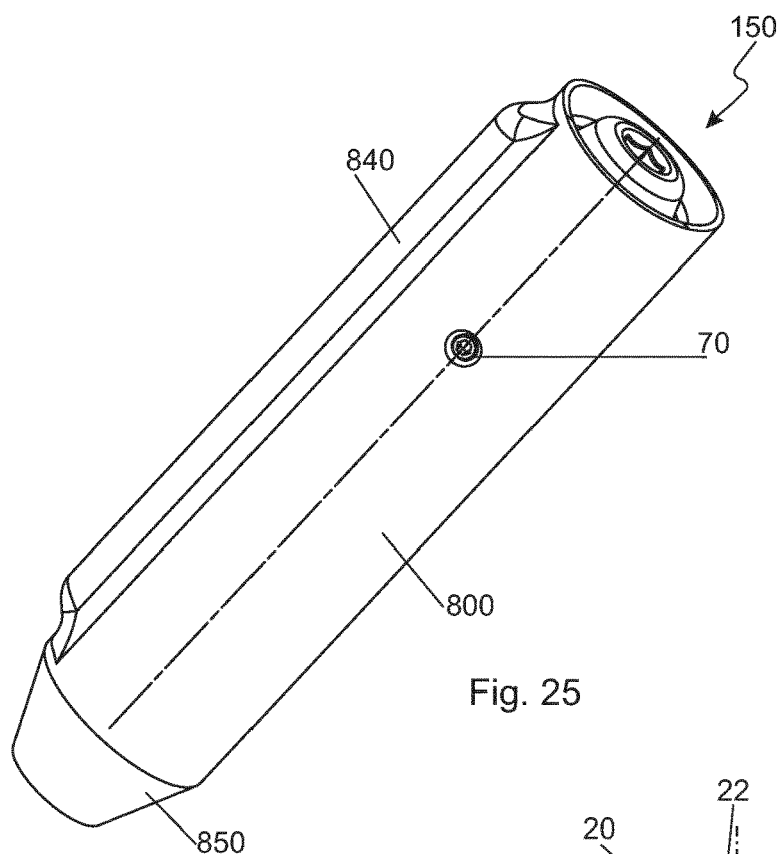
FIG. 25—A perspective view of an alternative embodiment of a locking device.
Figure 26:
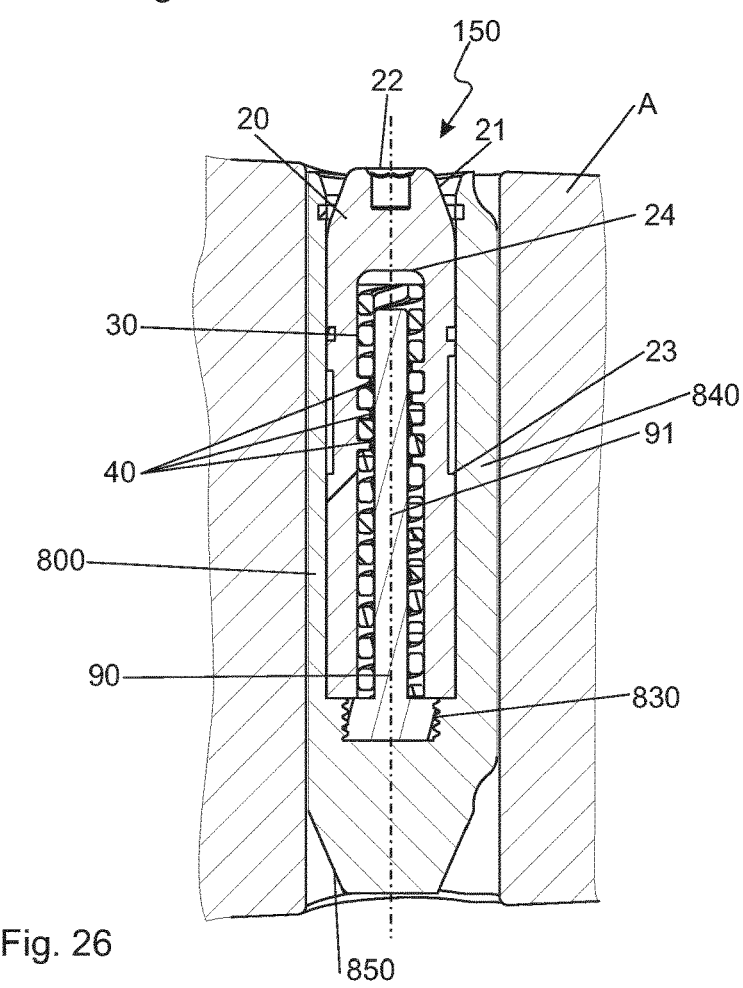
FIG. 26—A partial sectional view of the locking device of FIG. 25 installed in an adapter.

FIGS. 25 and 26 show an embodiment 150, similar to the previous one but with only one locking element 20. In this case, the supporting body 90 is screwed to the capsule 800 through a thread 830. The supporting body 90 comprises a perpendicular guide 91 to which a spring 30 is attached. The lower end of the capsule 800 comprises a second bearing surface 850. When a corresponding connected to the screwing means 22 is operated the whole length of the locking device is modified due to the fact that the locking element 20 and the second bearing surface 850 of the capsule 800 move in opposite directions. So, the locking device can be enlarged until each bearing surface (21, 850) contacts with their complementary bearing surfaces on the wear part 1 (no shown in FIG. 26). As a consequence, in this embodiment 150, the locking device fixes both sides of the tooth/adapter system.

The outer surface of the capsule 800 comprises a longitudinal projection 840 that is perpendicular to the axial direction of the capsule 800 to prevent the capsule 800 from rotating inside the housing 12 of the adapter 2. To prevent the locking element 20 from going out of the capsule 800, a stopping element 70 that crosses the capsule 800 is used, as previously described in the embodiment of FIGS. 12 and 13.

Figure 27:
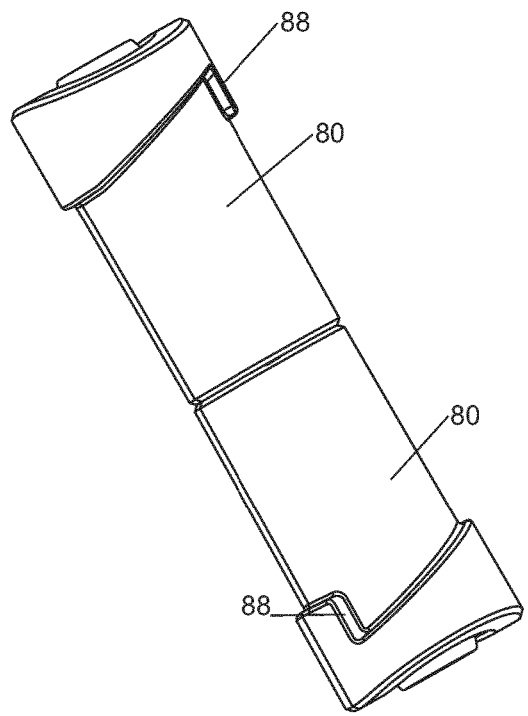
FIG. 27—A front view of two locking devices, opposed to each other.
Figure 28:
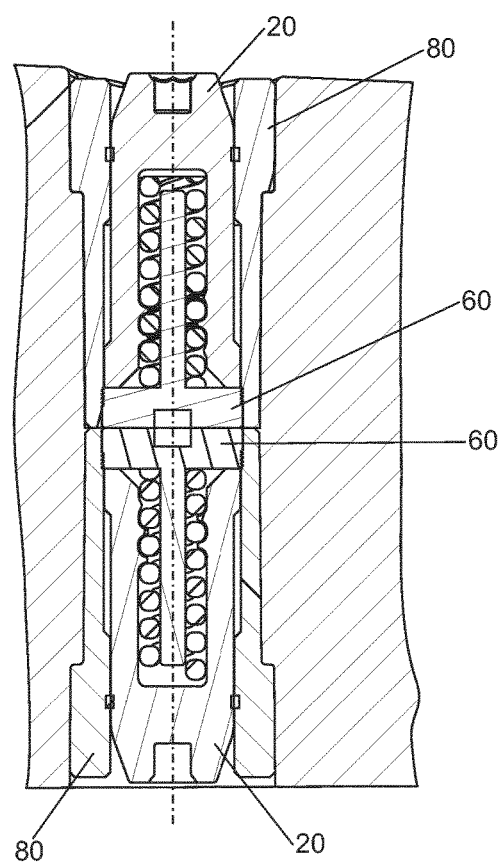
FIG. 28—A partial perspective view of an adapter with two locking devices opposed to each other.

FIGS. 27 and 28 show an embodiment where two locking devices 110 are used together in the same adapter 2. These two pins 110 are as the one described for FIGS. 8A-8B to 11A-11B. FIGS. 27 and 28 are an example of using two independent locking devices for fixing an adapter 2 and a wear member 1 through two opposite sides. Although the example refers to the pins 110 of FIGS. 8A-8B to 11A-11B, any other pin object of the present invention could be used. The use of two independent pins is useful when it is desired to have a more stable system, fixing the two sides of the wear element and adapter system, but there is no space between adapters to introduce a larger locking device such as embodiments 140 or 150 in the housing 12 with two locking elements (or at least with two bearing surfaces) as the ones described in FIGS. 23 to 26.

The installation and working sequence of the locking device 120 (FIGS. 12 and 13) will now be described with reference to FIGS. 29A-29B to 35, for securing a wear member 1 or tooth to an adapter 2. Although the description refers to the pin 120 of FIGS. 12 and 13, the same can be applied to the rest of the embodiments described above as the basic principles of the invention apply to all of the pins. The explanation will be made referring only to one of the pins but, the explanation may be extended to a coupling with only one pin in a housing 12 of an adapter 2, with two independent pins in a housing of adapter 2, with one pin with two locking elements or two bearing surfaces, or with one pin made up of two independent pins joined together. The pin can be shorter that the housing 12 or have the same length as the housing 12 of the adapter 2.

To secure the wear element 1 to an adapter 2, the locking device is introduced in a housing 12 of the adapter 2 with the lower end 86 of a capsule 50 inside the housing 12 and the upper end 85 of the capsule 50 facing the outside, see FIG. 29B. The locking device includes anti-rotation means 88 at the outer surface of the capsule 50 to prevent the rotation of the capsule 50 inside the housing 12. Once the pin is introduced in the housing 12, the locking element 20 is rotated with the help of a tool connected to the screwing means 22 foreseen at the top of the locking end of the locking element 20 and therefore screwed to the spring 30. So, the locking element 20 is introduced into the capsule 50 reducing the length of the pin until the bearing surface 21 is completely introduced in the capsule 50 and, consequently, in the housing 12 of the adapter. The locking element 20 is in what has been named the retracted position. This step has not to be done necessarily by the user as the pin may be provided to said user with the locking element 20 already screwed to the spring 30 and ready to be placed into the housing of the adapter.

The spring 30 is attached through its base 31 to the inner surface 52 of the base of the capsule 50 to prevent the rotation of the spring 30 around its axis when the locking element 20 is screwed or unscrewed over said spring 30. The capsule 50 further comprises a guide 62 that is introduced in the spring 30 to prevent failures during the screwing of the spring 30 and the locking element 20.

In a next step, see FIG. 30, the wear part 1 or tooth is mounted on the adapter 2. The tooth 1 has an orifice 11 that, when mounted over the adapter 2, coincides with the opening of the housing 12 of the adapter 2. To attach and secure the tooth 1 to the adapter 2, the locking element 20 is unscrewed (FIG. 31) until the locking element 20, specifically its bearing surface 21, contacts the inclined inner surface 13 (which defines a corresponding bearing surface) of the orifice 11 in the tooth 1.

In this position, the locking element 20 of the locking device interferes with the path of the tooth 1 and prevents the tooth 1 from coming out of the coupling with the adapter 2. This position has been named the unloaded position.

Up to this step, the spring 30 works as a thread, not as an element with elastic properties.

Figure 32:
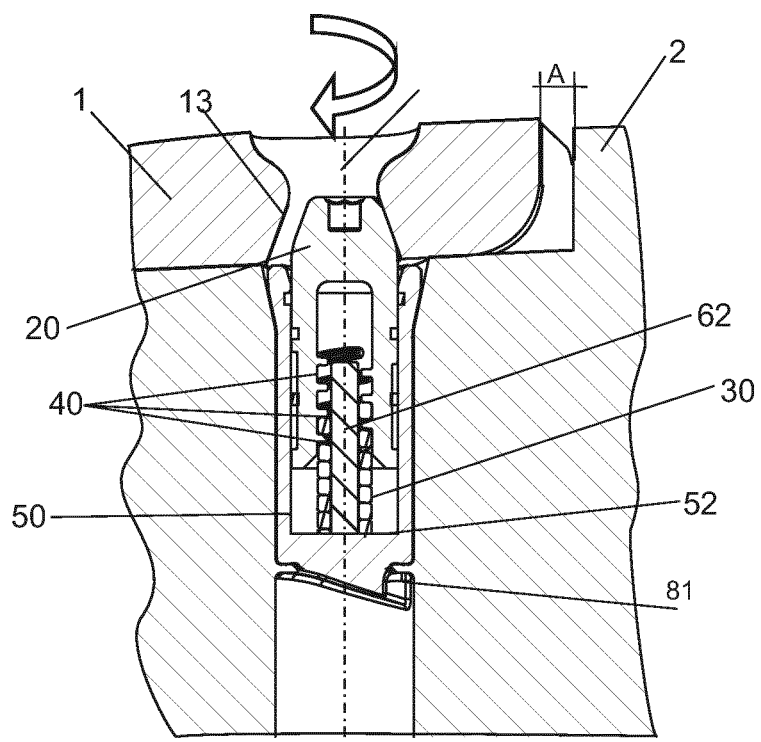
FIG. 32—A partial sectional view of the locking element being further unscrewed until the spring is compressed into the capsule, when the tooth and tooth holder have been coupled.

After the locking element 20 has contacted the bearing surface 13 of the orifice 11 of the tooth 1, if the locking element 20 is further unscrewed (see FIG. 32), the locking element cannot increase further its length and the spring 30 starts to compress in the cavity 84 of the capsule 50. The unscrewing of the locking element 20 follows until the spring 30 cannot move inwards anymore because it is completely compressed inside the cavity 84 of the capsule 50. In this point, the locking device 20 is in the correct final position for working: it cannot be more unscrewed and the spring 30 is blocked. This position is the compressed position or initial locking position. Although, a readjustment of the tooth/adapter system, when it starts to work, releases the spring 30 going out from the initial locking position, and the spring will experience a little expansion. This expansion will not be enough to allow the locking element 20 to be introduced completely inside the housing 12 in an accidental external hit over the locking device. In this position the spring 30 is resiliently loaded in the cavity 84 of the capsule 50.

An advantage of the invention is that, in spite of undesired external forces that may push the locking element 20 inwards, the locking element 20 cannot be introduced completely inside the housing anymore, because the spring 30 is in an almost completely compressed state and cannot be compressed more. Therefore, the locking element 20 cannot be moved out from the interference or blocking position, until it is screwed on the spring again.

Figure 33:
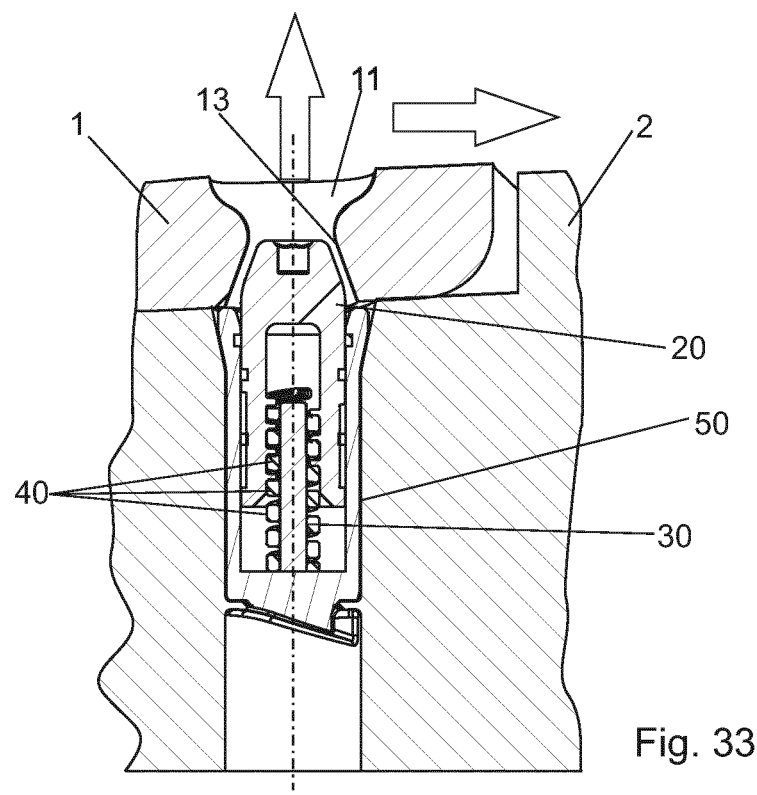
FIG. 33—A partial sectional view of the locking element when the tooth moves backwards during use when coupled on to the tooth holder.

While the tooth 1 is working the pin maintains it coupled on the adapter 2, at a certain distance A between the tooth and the adapter. After a continuous use over the time, the contact surfaces between the tooth 1 and the adapter 2 will suffer plastic deformation and inner wear, especially in the hole of the wear member and above all on the nose of the adapter. This will produce a gap that may cause an undesired play between contact surfaces of the tooth 1 and adapter 2 that may force a movement of the tooth 1 backwards, see FIG. 33.

Figure 34:
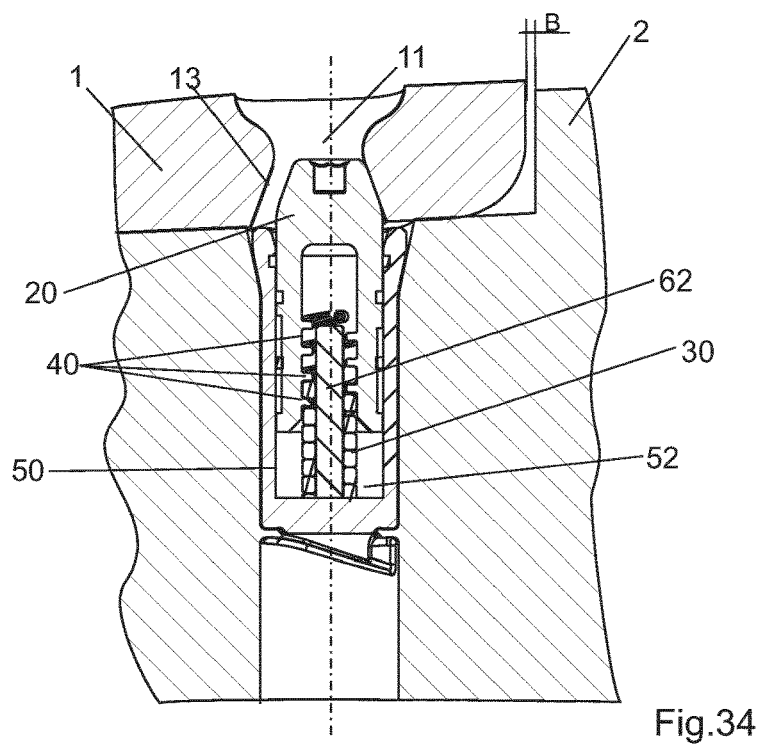
FIG. 34—A partial sectional view of the locking element when the tooth has moved backwards during use and the locking element has been repositioned.

This movement may cause that the contact between the bearing surface 21 of the locking element 20 and the bearing surface 13 of the orifice 11 of the wear member 1 could disappear. But, due to the resiliently loaded spring 30, the contact is established again, see FIG. 34, because the spring 30 continuously pushes the locking element 20 against the bearing surface 13 of the orifice 11 of the tooth 1, adapting the length of the locking device to absorb the mentioned gap. So a tensioned tooth and adapter system is recovered, reducing or removing the play between both. In this point, the related distance between the tooth and the adapter has decreased to a certain value B.

Figure 35:
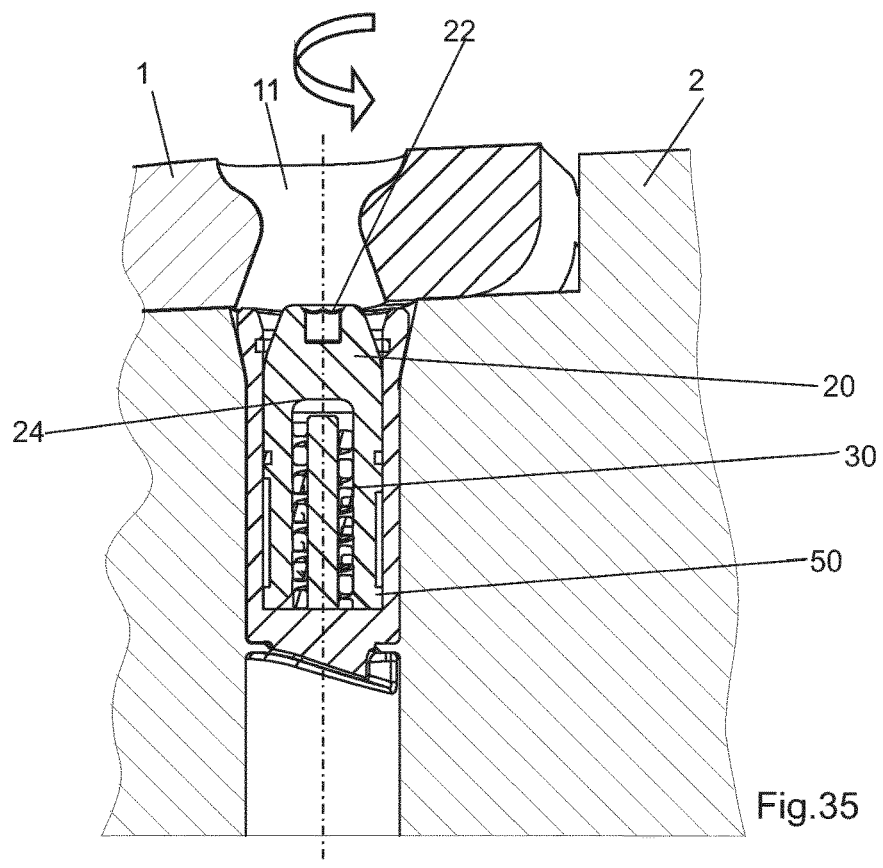
FIG. 35—A partial sectional view of the locking element being screwed to uncouple the tooth and tooth holder.

To detach the tooth 1 from the adapter 2 in order to replace the same by a new one, see FIG. 35, the locking element 20 should be screwed again on the spring 30 with the help of a tool. In this step, the compressed part of the spring 30 starts to decompress and is screwed again to the locking element 20. The locking element 20 is screwed to the spring until it is introduced in the housing 12 so that the interference between the tooth 1 and the adapter 2 disappears and the tooth may be detached from the adapter.

As can be seen, in the example of FIGS. 29A-29B to 35, the locking device has anti-rotation means formed as a wall 88 extending parallel to the longitudinal axis and ejection means that includes a helicoidal wall 81 having the same axis as the spring 30. But in this case both are in the lower surface of the base of the supporting body 61.

Figures 36A, 36B, 36C, 36D, 36E:
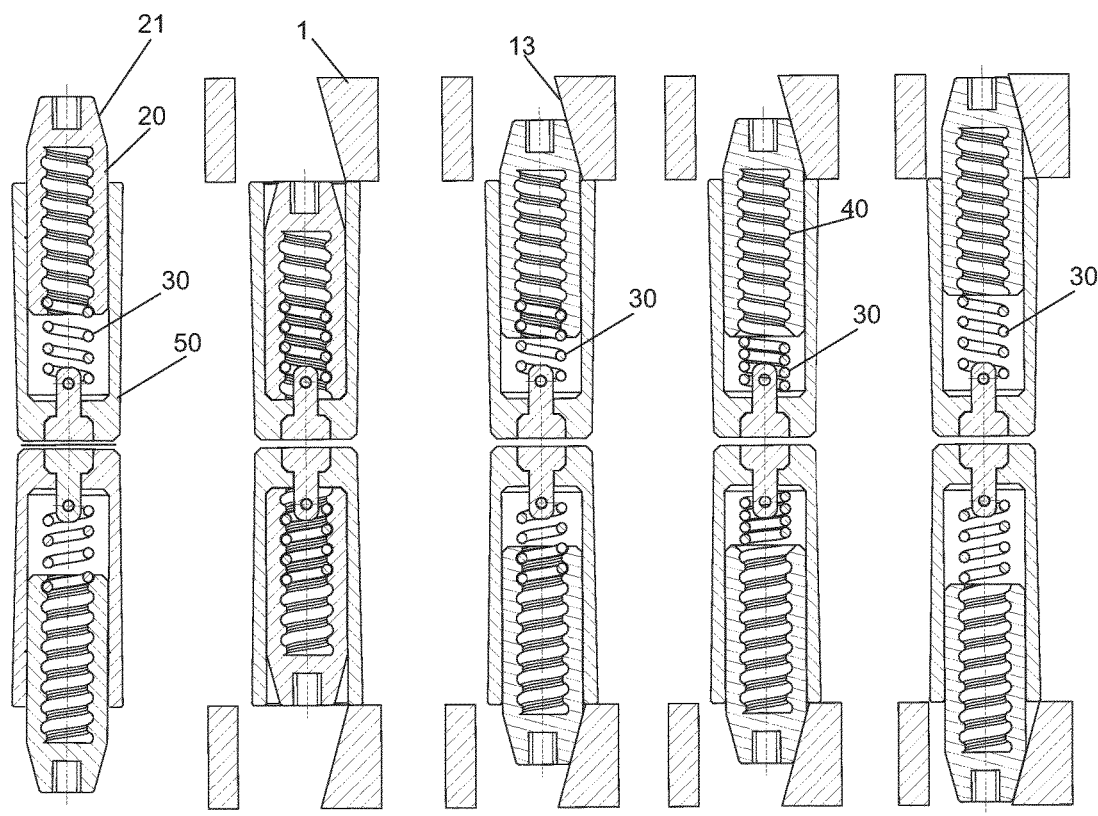
FIGS. 36A-36E—A schematic sectional view of the assembly sequence in an alternative embodiment of the invention.

FIGS. 36A-36E are a schematic view of another example of mounting of a locking device according to the invention. FIG. 36A shows the introduction of the locking element 20 into the capsule 50 by rotating the locking element 20 which provokes its screwing over the spring 30. FIG. 36B shows the locking element in its fully retracted position so that the wear part 1 can be placed so that the orifice 11 is overlapped with the housing 12 of the adapter 2 (not represented in these figures) and with the locking device which is allocated in its interior. FIG. 36C corresponds to the position in which the locking element 20 has been unscrewed from the spring 30 until the bearing surface 21 contacts the corresponding bearing surface 13 of the wear part 1. In this position, the spring is still in an unloaded state, so the position can be called the unloaded position. Unscrewing further the locking element 20 provokes that the part of the spring 30 outside the thread 40 compresses achieving what has been named the compressed position or the initial locking position. The geometry of the different components of the locking device is such that the whole spring 30 can be unscrewed from the thread 40 and remains in a compressed state. At this point, when the operator continues rotting the locking element 20 he hears a loud "click" each time that the end of the spring passes through the end of the thread 40. This informs him that the assembly has been finished, and it also avoids that the operator overturns the spring 30. FIG. 36E shows the case in which the relative position between the wear part 1 and the adapter 2 has changed (due to wearing and/or plastic deformation) and the locking element 20 projects outwardly a bigger amount than in the initial locking position of FIG. 36D. The spring 30 has expanded partially but the locking device maintains a proper fixing between the wear part 1 and the adapter 2. This position can be considered as the final locking position. In fact, both the initial locking position and the final locking position are locking positions but in the initial locking position the spring 30 is in a completely compressed state (and, in the case of FIGS. 36A-36E, completely outside of the thread 40) whereas in the final locking position the spring 30 has expanded a certain amount in order to compensate the movement between the worn and/or deformed wear part 1 and adapter 2.

It is obvious for a person skilled in the art that other combinations of the describe features are possible, all of them having as common feature at least a spring threaded to a locking element.

Figure 37:
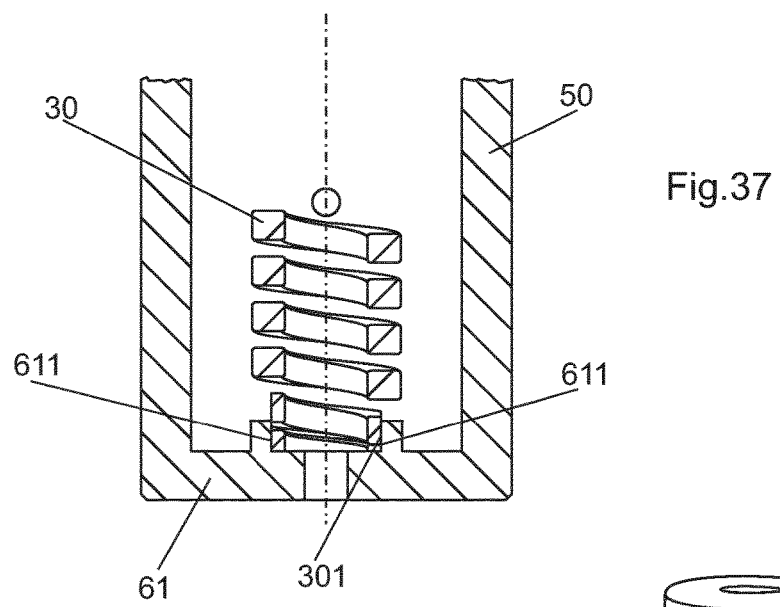
FIG. 37—A partial sectional view of a capsule and a spring fixed to it.
Figure 38:
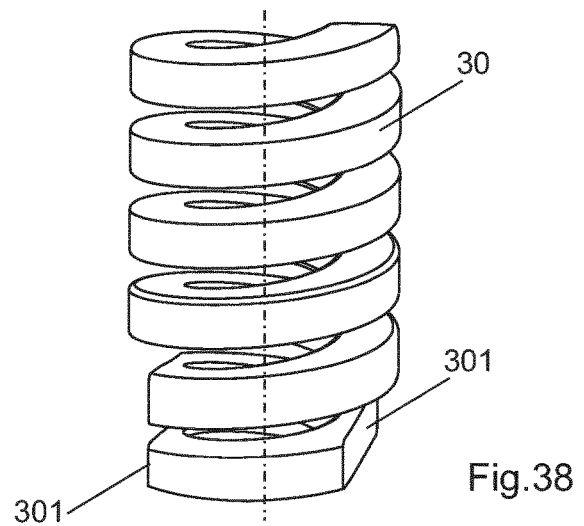
FIG. 38—A perspective view of the spring of FIG. 37.

FIG. 37 shows a partial sectional view of a capsule 50 with a supporting body 61, both built as a single element, and a spring 30 fixed to it. The spring 30 (see also FIG. 38) has two flat surfaces 301 in the end of its outer lateral surface close to the supporting body 61 and the supporting body 61 has two corresponding flat surfaces 611 in contact with the flat surfaces 301 of the spring. These flat surfaces 301, 611 restrict the rotation of the spring 30.

Figure 39:
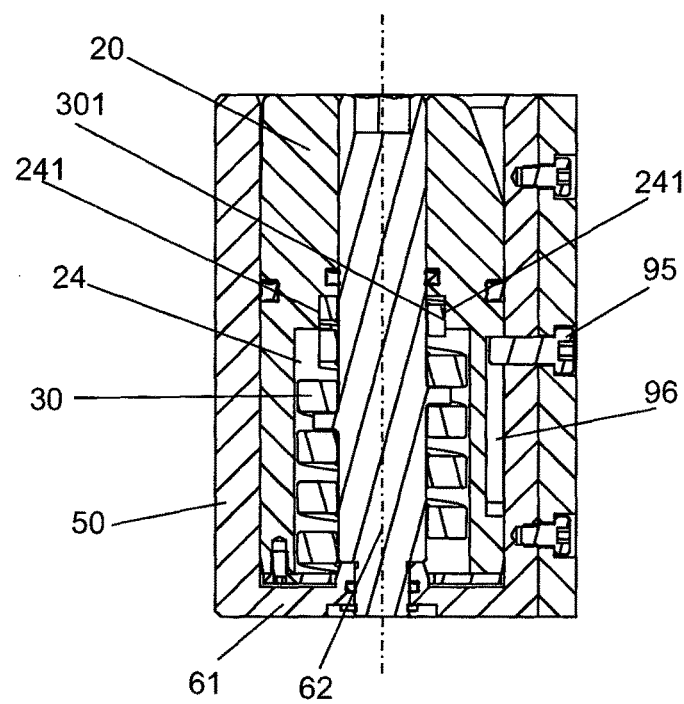
FIG. 39—A sectional view of an alternative embodiment of a locking device.
Figure 40:
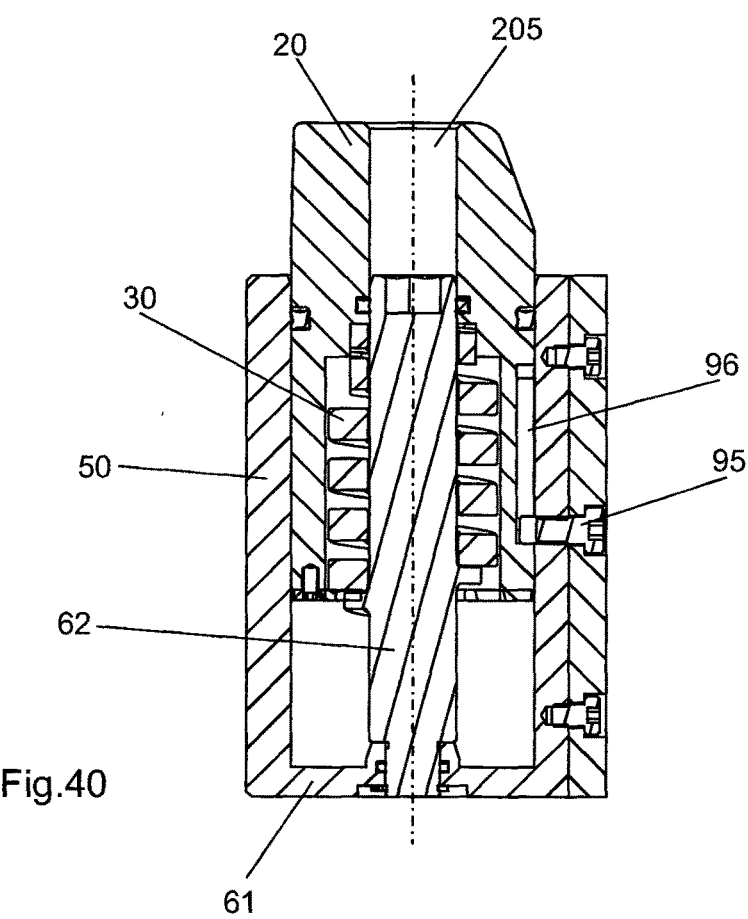
FIG. 40—A sectional view of the locking device of FIG. 39 in extended position.

FIGS. 39 and 40 show a sectional view of an alternative embodiment of a locking device that includes an alternative version of the concept describes in the previous paragraph. In this case the locking element 20 has an inner cavity 24 and the spring 30 is allocated in the inner cavity 24 and is fixed to the locking element 20 in the upper inner part of the inner cavity 24. The spring 30 has at least two flat surfaces 301 in the end of its outer lateral surface close to the locking end and the inner cavity 24 has two corresponding flat surfaces 241 in contact with the flat surfaces 301 of the spring 30.

The embodiment of FIGS. 39 and 40 shows also a locking device in which the guide 62 is rotatably fixed to the supporting body 61 (i.e., it is fixed in such a way that it can be rotated in respect of the supporting body). The locking element 20 has an access hole 205 at the locking end. The locking device comprises also second anti-rotation means (in the present example in form of a screw 95 and a groove 96 parallel to the longitudinal axis) able to avoid the rotation of the locking element 20 in respect of the capsule 50. In this way, the rotation of the locking element 20 during its use is avoided, but, thanks to the access hole 205, the operator can easily introduce the corresponding tool in it and rotate the guide 62, so that it is possible to move the locking element 20 in the sense of the longitudinal axis. When turning the guide 62, the spring 30 is moved upwards and pushes the locking element 20 upwards until it contacts the tooth 1.

After that, a further turning of the guide 62 provokes the compression of the spring 30 in the upper part of the inner cavity 24, so that the system remains in a tensioned state.

FIGS. 43A-43B show an upper view and a sectional view according to line B-B, respectively, of an alternative embodiment of a locking device, in which the locking element 20 comprises a core 201 and a casing 203. The core 201 is rotatably mounted in the casing 203 (i.e., is mounted in such a way that can be rotated in respect of the casing). The casing 203 comprises the locking end and has an access hole 205 at the locking end. The locking device additionally comprises second anti-rotation means (in the present example, again in form of a screw 95 and a groove 96 parallel to the longitudinal axis) able to avoid the rotation of the casing 203 in respect of the capsule 50. Similarly as in the previous case, this solution avoids the involuntary rotation of the locking element 20 during its use, but, thanks to the access hole 205, the operator can easily introduce the corresponding tool in it and rotate the core 201, so that it is possible to move the locking element 20 in the sense of the longitudinal axis, upwards due to the fact the core pushes directly the upper inner part of the casing, and downwards thanks to a sheet fixed to the base of the casing 203 and that extends below the base of the core 201. FIGS. 44A-44B show a sectional view according to line A-A and according to line B-B, respectively, of the locking device of FIGS. 43A-43B in extended position.

In the previously described alternatives comprising an access hole 205, the locking device preferably includes a cap 209 that closes the access hole during use in order to avoid that earth or debris goes inside the locking device.

Figure 41:
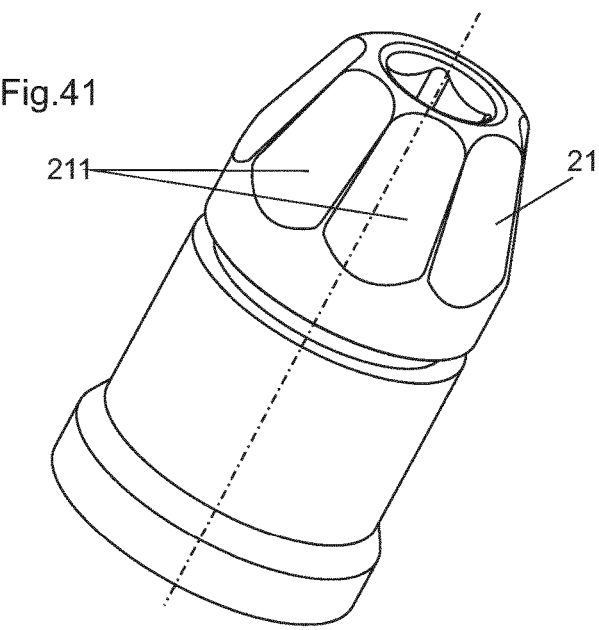
FIG. 41—A perspective view of an alternative embodiment of a locking element.
Figure 42:
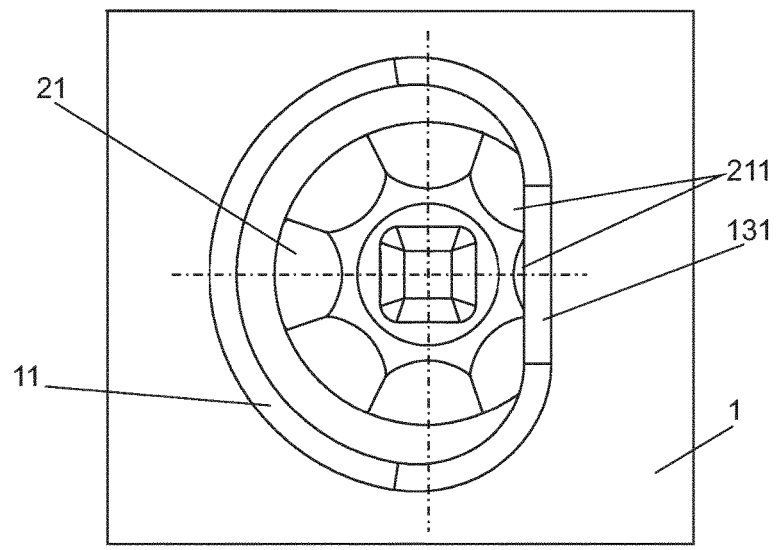
FIG. 42—An upper partial view of the locking element of FIG. 41 and the orifice 11 of a wear element.
Figure 45:
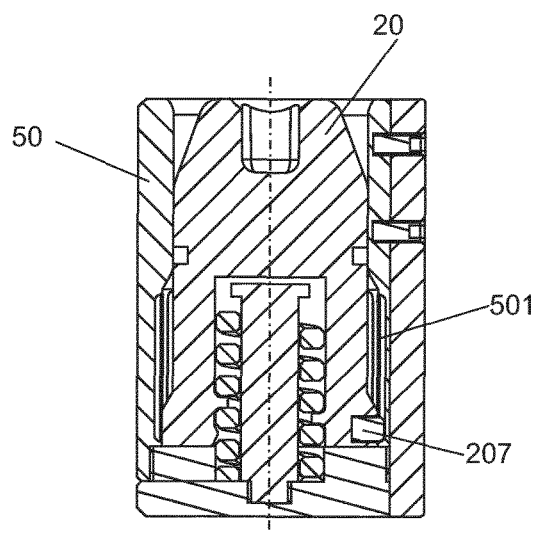
FIG. 45—A sectional view of an alternative embodiment of a locking device.
Figure 46:
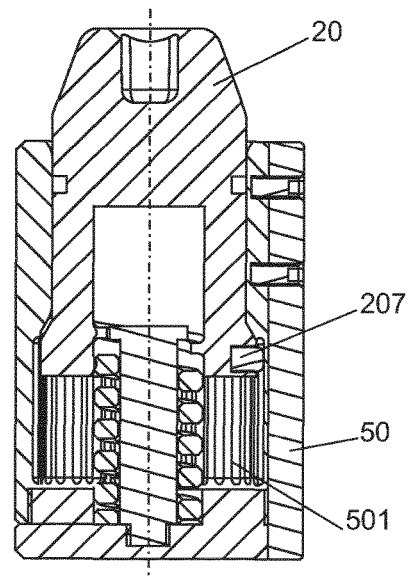
FIG. 46—A sectional view of the locking device of FIG. 45 in extended position.
Figure 47:
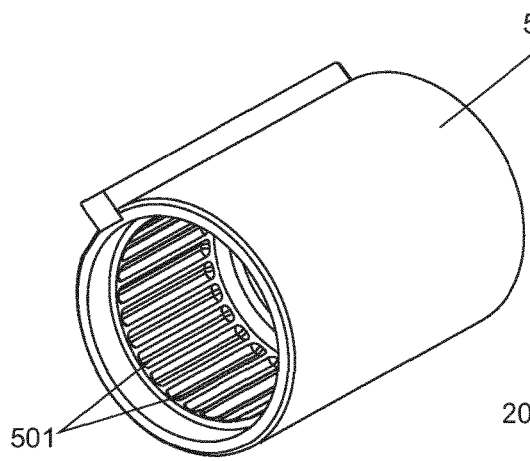
FIG. 47—A perspective view of the capsule of the locking device of FIG. 45.
Figure 48:
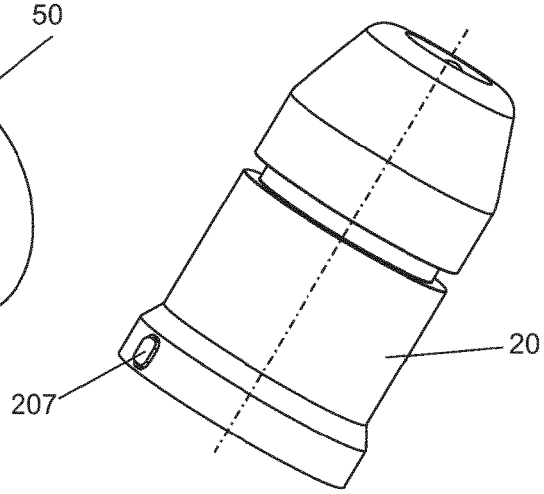
FIG. 48—A perspective view of the locking element of the locking device of FIG. 45.

FIG. 41 sows a perspective view of an alternative embodiment of a locking element whose bearing surface 21 of its locking end has a plurality of flat faces 211, with the shape of a frustum of a pyramid. In the mounted position (see FIG. 42), one of the flat faces 211 is in contact with a corresponding flat face 131 present in the bearing surface 13 of the orifice 11 of the wear element 1. So, it is much more difficult for the locking element 20 to rotate as it has to "jump" from one flat face 211 to the next one.

FIGS. 45-48 show another alternative embodiment of a locking device. In this embodiment, the capsule 50 has, in its inner lateral surface, a plurality of grooves 501 parallel to each other and extending parallel to the longitudinal axis and the locking element 20 has, in its outer lateral surface, one elastic protrusion 207 allocated in one of the grooves 501. The elastic protrusion 207 is, for example, of an elastomeric material and can be elastically deformed so that it can be displaced from one of the grooves 501 to another one through a relative rotation movement, along the longitudinal axis, of the capsule 50 in respect of said locking element 20. With a proper selection of the hardness of the elastomeric material and the geometries of the grooves 501, the elastic protrusion 207 and the gap between them it is possible to have a locking element that can be rotated when the operator uses the corresponding tool but that does not rotate during use.

The invention claimed is:

1. A locking device for securing a wear part on a support for excavators that comprises:
   a locking element, with a locking end,
   a thread,
   at least one helical spring defining a longitudinal axis, where said at least one helical spring is at least partially threaded in said thread, and
   screwing means for screwing and unscrewing said locking element in or from said spring, wherein in a partially threaded position, a part of the at least one helical spring is an unthreaded part which is not threaded in said thread and the at least one helical spring has unthreaded turns in the unthreaded part free so that the unthreaded part is able to change its length so that the at least one helical spring works both as a screw and as a spring.

2. The locking device according to claim 1 wherein said support comprises a housing and the wear part comprises an orifice wherein in a mounted position, said housing and said orifice are at least partially overlapped, where said locking device is able to be introduced in said housing, where, in said mounted position, said locking end at least partially emerges from said housing and penetrates into said orifice, and the locking device further comprises a supporting body allocated in a bottom of said housing, said spring being fixed in respect of said supporting body in order to prevent rotation of said spring in respect of said supporting body.

3. The locking device according to claim 2 wherein said locking end comprises a bearing surface, said bearing surface forming a non-zero angle with said longitudinal axis, where, in said mounted position, said bearing surface is in contact with a corresponding bearing surface present in said orifice.

4. The locking device according to claim 2 wherein said supporting body comprises a guide introduced in said spring.

5. The locking device according to claim 2 further comprising a capsule, said capsule able to accommodate at least partially said locking element, where said supporting body is fixed to one end of said capsule.

6. The locking device according to claim 5 wherein said capsule comprises anti-rotation means able to avoid the rotation of said supporting body in respect of said housing in said mounted position, said anti-rotation means comprising a wall extending parallel to said longitudinal axis.

7. The locking device according claim 1 wherein said thread is in said locking element, and said locking element has an inner cavity, said thread being placed on an inner surface of said inner cavity of said locking element.

8. The locking device according to claim 1 further comprising a second locking element, said second locking element being opposed to said locking element, and a second spring opposed to said spring.

9. The locking device according to claim 1 wherein screwing means are in said locking element.

10. The locking device according to claim 1 wherein said locking element comprises an internal insert disposed in an inner cavity of said locking element, where said thread is in said insert.

11. The locking device according to claim 2 wherein said spring has at least one flat surface in the end of an outer lateral surface close to said supporting body and said supporting body has a corresponding flat surface in contact with said flat surface of said spring.

12. The locking device according to claim 2 wherein said locking element has an inner cavity and said spring is allocated in said inner cavity and is fixed to said locking element, where said spring has at least one flat surface in the end of an outer lateral surface close to said locking end and said inner cavity has a corresponding flat surface in contact with said flat surface of said spring.

13. The locking device according to claim 3 wherein bearing surface of said locking end has at least one flat face, where, in said mounted position, said flat face of said bearing surface of said locking end is in contact with a corresponding flat face present in the bearing surface of the orifice, and the locking end has a plurality of said flat faces.

14. The locking device according to claim 4 wherein said guide is rotatably fixed to said supporting body, where said locking element has an access hole at said locking end and, said locking device comprises second anti-rotation means able to avoid the rotation of said locking element in respect of said capsule.

15. The locking device according to claim 5, wherein said locking element comprises a core and a casing, said core being rotatably mounted in said casing, where said casing comprises said locking end and has an access hole at said locking end, and said locking device comprises second anti-rotation means able to avoid the rotation of said casing in respect of said capsule.

16. The locking device according to claim 5 wherein said capsule has in an inner lateral surface, a plurality of grooves parallel to each other and extending parallel to said longitudinal axis and said locking element has in an outer lateral surface, at least one elastic protrusion allocated in one of said grooves, said elastic protrusion being able to be elastically deformed so said elastic protrusion can be displaced from one of said grooves to another one through a relative rotation movement along said longitudinal axis of said capsule in respect of said locking element.

17. The locking device according to claim 2 wherein the length of said locking element and said spring in an at least partially threaded position in said thread is smaller or equal than the length of said housing.

18. The locking device according to claim 17 wherein the length of said locking element and said spring in a completely threaded position in said thread is smaller or equal than the length of said housing.

19. A wearable system comprising a wear part, and a support, where said support comprises a housing and said wear part comprises an orifice so that, in a mounted position, said housing and said orifice are at least partially overlapped, wherein said wearable system comprises a locking device according to claim 1, where said locking device is able to be introduced in said housing and in the mounted position said locking end at least partially emerges from said housing and penetrates into said orifice.

20. A process for fixing a wear part to a support with a locking device, where said support comprises a housing and the wear part comprises an orifice so that, in a mounted position, said housing and said orifice are at least partially overlapped, where said locking device is able to be introduced in said housing, said locking device comprising: a locking element, with a locking end, where, in said mounted position, said locking end at least partially emerges from said housing and penetrates into said orifice, a thread of said locking element and at least one helical spring defining a longitudinal axis, where said spring is at least partially threaded in said thread, said spring being fixed in respect of said support in order to prevent rotation of the spring in respect of said support, where, in a partially threaded position, an unthreaded part of the spring has unthreaded turns free so that the unthreaded part is able to change length so that the spring works both as a screw and as a spring, comprises the following steps:
  insertion of said locking device in said housing,
  positioning of said wear part over said support in said mounted position, so that said housing and said orifice are at least partially overlapped,
  unscrewing said locking element from said spring until said locking end penetrates into said orifice and contacts said wear part, and further unscrewing said locking element from said spring until said spring is in a compressed state.

21. The process according to claim 20 further comprising the step of unscrewing said locking element from said spring until said spring is in a completely compressed state.

22. The process according to claim 20 wherein the length of said locking element and said spring in an at least partially threaded position in said thread is smaller or equal than the length of said housing.

23. The process according to claim 22 wherein the length of said locking element and said spring in a completely threaded position in said thread is smaller or equal than the length of said housing.

24. A wearable system comprising a wear part, a support and a locking device, where said support comprises a housing and said wear part comprises an orifice so that in a mounted position, said housing and said orifice are at least partially overlapped, where said locking device is able to be introduced in said housing, said locking device comprising:

a locking element with a locking end, wherein in the mounted position said locking end at least partially emerges from said housing and penetrates into said orifice, at least one helical spring defining a longitudinal axis, a thread of said locking element where said spring is at least partially threaded in said thread, said spring being fixed in respect of said support in order to prevent rotation of said spring in respect of said support, and screwing means for screwing and unscrewing said locking element in or from said spring, wherein, in a partially threaded position, part of the at least one helical spring is an unthreaded part which is not threaded in said thread and the at least one helical spring has unthreaded turns in the unthreaded part free so that the unthreaded part is able to change length so that the at least one helical spring works both as a screw and as a spring.

\* \* \* \* \*